US010996962B2

(12) United States Patent
Zohar et al.

(10) Patent No.: US 10,996,962 B2
(45) Date of Patent: May 4, 2021

(54) ACQUISITION PROCESS OF GUI ELEMENTS USING USER INPUT

(71) Applicant: WalkMe Ltd., Tel-Aviv (IL)

(72) Inventors: Ron Zohar, Givatayim (IL); Moran Shemer, Ra'anana (IL); Nir Nahum, Tel-Aviv (IL)

(73) Assignee: WalkMe Ltd., Tel-Aviv (IL)

( * ) Notice: Subject to any disclaimer, the term of this patent is extended or adjusted under 35 U.S.C. 154(b) by 0 days.

(21) Appl. No.: 16/877,825

(22) Filed: May 19, 2020

(65) Prior Publication Data

US 2021/0089332 A1 Mar. 25, 2021

Related U.S. Application Data

(63) Continuation of application No. 16/692,146, filed on Nov. 22, 2019, now Pat. No. 10,713,068, which is a continuation of application No. PCT/IL2019/051037, filed on Sep. 19, 2019.

(51) Int. Cl.
*G06F 8/38* (2018.01)
*G06F 9/451* (2018.01)

(52) U.S. Cl.
CPC .............. *G06F 9/451* (2018.02); *G06F 8/38* (2013.01)

(58) Field of Classification Search
CPC .................................................. G06F 8/654
See application file for complete search history.

(56) References Cited

U.S. PATENT DOCUMENTS

| 9,922,008 B2 | 3/2018 | Cohen et al. | |
| 9,934,782 B2 | 4/2018 | Zohar et al. | |
| 2003/0069877 A1* | 4/2003 | Grefenstette | ....... G06F 16/3323 |
| 2009/0217309 A1* | 8/2009 | Grechanik | .......... G06F 11/3692 |
| | | | 719/328 |
| 2015/0082280 A1 | 3/2015 | Betak et al. | |
| 2015/0312227 A1* | 10/2015 | Follis | .................... H04L 63/126 |
| | | | 713/176 |
| 2016/0231870 A1* | 8/2016 | Summa | ................... G06F 9/542 |
| 2017/0116184 A1* | 4/2017 | Bradley | ............... G06F 40/263 |

(Continued)

OTHER PUBLICATIONS

International Search Report and Written Opinion issued by the International Searching Authority for corresponding International Patent Application No. PCT/IL2019/051037, dated Jan. 2, 2020.

(Continued)

*Primary Examiner* — Di Xiao
(74) *Attorney, Agent, or Firm* — Myers Wolin, LLC

(57) ABSTRACT

A method, system and product for improving acquisition process of GUI elements using user input. A method comprises obtaining a digital representation of a first version of a GUI that includes a GUI element, obtaining a digital representation of a second version of the GUI, obtaining an identified element that was identified, using an acquisition process operated on the second version of the GUI, as being estimated to correspond to the GUI element in the first version of the GUI. The first version of the GUI and the second version of the GUI may be displayed in parallel to a user. User input indicative of whether the identified element corresponds to the GUI element, based on the display, may be obtained. The acquisition process may be updated based on the user input.

24 Claims, 11 Drawing Sheets

(56) References Cited

U.S. PATENT DOCUMENTS

| | | | |
|---|---|---|---|
| 2017/0192873 A1* | 7/2017 | Ozdemir | G06F 8/658 |
| 2017/0274267 A1* | 9/2017 | Blahnik | G06F 3/0484 |
| 2017/0277374 A1 | 9/2017 | Ozcan et al. | |
| 2018/0136909 A1* | 5/2018 | Elliot | G06F 9/547 |
| 2018/0150436 A2* | 5/2018 | Ben-Aharon | G06F 40/186 |
| 2019/0259144 A1 | 8/2019 | Pathapati et al. | |

OTHER PUBLICATIONS

Non Final Office Action issued for corresponding U.S. Appl. No. 16/692,146 electronically dated Apr. 3, 2020.

* cited by examiner

ACQUISITION PROCESS OF GUI ELEMENTS USING USER INPUT

CROSS-REFERENCE TO RELATED APPLICATION

This application is a continuation and claims the benefit of U.S. patent application Ser. No. 16/692,146 filed Nov. 22, 2019, which is a continuation of PCT application PCT/IL2019/051037, all of which are hereby incorporated by reference in their entirety without giving rise to disavowment.

TECHNICAL FIELD

The present disclosure relates to Graphical User Interfaces (GUIs) in general, and to acquisition process for GUI elements to achieve robustness to GUI modifications, in particular.

BACKGROUND

An application having a Graphical User Interface (GUI) may take many forms. It may have a web version, running in browsers such as CHROME™, FIREFOX™, or the like. Additionally or alternatively, the application may have a desktop version, running on WINDOWS™, OSX™, or the like. Additionally or alternatively, the application may have a native mobile version, running on iOS™, ANDROID™, or the like. Additionally or alternatively, the application may have a web mobile version, running on mobile browsers. Additionally or alternatively, the application may have been written using a cross platform framework such as XAMARIN™, REACT NATIVE™, or the like.

Due to differences in the underlying platform, each version may be different. For example, even using the same programming language may result in different outcomes, such as the case due to different JavaScript engines for each platform. Additionally or alternatively, due to different screen sizes, capabilities, or the like, the same application may have different GUI on each platform.

Additionally or alternatively, during the life cycle of an application it may change. Features may be added, removed, or change place. Additionally or alternatively, the User eXperience (UX) may change, resulting in a changing GUI over time. Additionally or alternatively, users with different roles or permissions may see different views of the same screen.

BRIEF SUMMARY

One exemplary embodiment of the disclosed subject matter is a method comprising: obtaining a digital representation of a first version of a Graphical User Interface (GUI), wherein the GUI comprises a GUI element; obtaining a digital representation of a second version of the GUI; obtaining an identified element, wherein the identified element is identified, using an acquisition process operated on the second version of the GUI, as being estimated to correspond to the GUI element in the first version of the GUI; displaying, in parallel, the first version of the GUI and the second version of the GUI, wherein said displaying comprises: presenting a visual indication of the GUI element in the first version of the GUI; and presenting a visual indication of the identified element in the second version of the GUI; obtaining user input, wherein the user input is indicative of whether the identified element corresponds to the GUI element; and updating the acquisition process based on the user input.

Optionally, the acquisition process is performed by applying a representation set representing the GUI element, wherein the representation set comprises a plurality of alternative representations, each of which provides an independent manner of identifying the GUI element in GUIs, wherein said applying the representation set comprises applying, independently, each alternative representation in at least a subset of the plurality of alternative representations, wherein said updating the acquisition process comprises updating the representation set.

Optionally, the digital representation of the first version is based on a first Document Object Model (DOM) object, wherein the digital representation of the second version is based on a second DOM object.

Optionally, the acquisition process utilizes a detection model configured to detect an element in a target GUI that corresponds to the GUI element in the first version of the GUI, wherein the detection model is configured to receive a feature vector, wherein the feature vector comprises properties of the target GUI, wherein said updating the acquisition process comprises updating the detection model based on the user input.

Optionally, the acquisition process utilizes a similarity model, wherein the similarity model is configured to receive one or more properties of an original version of a GUI, one or more properties of a GUI element in the original version of the GUI, one or more properties of a new version of the GUI, and one or more properties of an element in the new version of the GUI, wherein the similarity model is configured to provide a similarity measurement regarding likelihood that the element in the new version of the GUI corresponds to the GUI element in the original version of the GUI, wherein said updating the acquisition process comprises updating the similarity model based on the user input.

Optionally, the acquisition process is based on a detection model of the GUI element in the first version of the GUI, wherein the detection model is generated using a model generator, wherein the model generator is configured to be provided with at least one or more properties of the first version of the GUI and one or more properties of the GUI element, wherein the method further comprises updating the model generator using the user input, the second version of the GUI and the identified element.

Optionally, the method comprises: a client device obtaining the digital representation of the second version of the GUI; the client device performing the acquisition process; the client device reporting the digital representation of the second version of the GUI and the identified element to a server.

Optionally, the method comprises: the client device determining a confidence measurement regarding accuracy of the acquisition process; and wherein said reporting is contingent on the confidence measurement being below a threshold.

Optionally, the client device is configured to acquire the GUI element in versions of the GUI to provide at least one of: monitor behavioral statistics of usage of the GUI element in the GUI, and enhance user experience of the GUI using an augmentation of the GUI.

Optionally, said updating the acquisition process is performed by the server, wherein the acquisition process is based on a model that is trained based on confidence measurements derived, at least in part, based on the user input.

Optionally, the user input is one of: confirming that the identified element corresponds to the GUI element; and denying that the identified element corresponds to the GUI element.

Optionally, the user input comprises a manual indication of a second element in the second version of the GUI that corresponds to the GUI element in the first version of the GUI.

Optionally, in response to a user input denying that the identified element corresponds to the GUI element, presenting a visual indication of an alternative element in the second version of the GUI that is estimated to correspond to the GUI element in the first version of the GUI.

Optionally, the method further comprises obtaining a list of alternative estimated elements and corresponding confidence measurements, wherein the list comprises the identified element having a first confidence measurement and the alternative element having a second confidence measurement, wherein the first confidence measurement is greater than the second confidence measurement.

Optionally, the acquisition process is performed by identifying an element in the second version of the GUI using a representation of the GUI element; wherein said updating the acquisition process based on the user input comprises: updating the representation of the GUI element.

Optionally, the method comprises providing to a plurality of client devices the updated representation of the GUI element, whereby each of the plurality of client devices is enabled to acquire the GUI element in GUIs.

Optionally, the representation of the GUI element comprises a plurality of alternative representations of the GUI, wherein said updating the representation of the GUI element comprises: removing a subset of the plurality of alternative representation of the GUI from the representation of the GUI element.

Optionally, the subset of the plurality of alternative representations do not conform with the user input.

Optionally, the user input indicates that the element in the second version of the GUI does not correspond to the GUI element in the first version of the GUI, wherein the subset of the plurality of alternative representations are representation in which the element is identified in the second version of the GUI.

Optionally, the user input indicates that the element in the second version of the GUI corresponds to the GUI element in the first version of the GUI, wherein the subset of the plurality of alternative representations are representation in which the element is not identified in the second version of the GUI.

Another exemplary embodiment of the disclosed subject matter is a system comprising: a data repository retaining a plurality of versions of Graphical User Interfaces (GUIs) and corresponding GUI elements in the GUIs; a plurality of client devices, wherein each client device is configured to: obtain digital representations of versions of the GUIs; and transmit the digital representations of the version of the GUIs to said data repository; and a server configured to: obtain from said data repository, a first and second versions of a GUI; obtain a GUI element that is comprised by the first version of the GUI; obtain an identified element, wherein the identified element is identified, using an acquisition process operated on the second version of the GUI, as being estimated to correspond to the GUI element in the first version of the GUI; display, in parallel, the first version of the GUI and the second version of the GUI while presenting a visual indication of the GUI element in the first version of the GUI and presenting a visual indication of the identified element in the second version of the GUI; obtain user input, wherein the user input is indicative of whether the identified element corresponds to the GUI element; and updating the acquisition process based on the user input.

Yet another exemplary embodiment of the disclosed subject matter is a non-transitory computer readable medium retaining program instructions, which program instructions when read by a processor, cause the processor to perform a method comprising: obtaining a digital representation of a first version of a Graphical User Interface (GUI), wherein the GUI comprises a GUI element; obtaining a digital representation of a second version of the GUI; obtaining an identified element, wherein the identified element is identified, using an acquisition process operated on the second version of the GUI, as being estimated to correspond to the GUI element in the first version of the GUI; displaying, in parallel, the first version of the GUI and the second version of the GUI, wherein said displaying comprises: presenting a visual indication of the GUI element in the first version of the GUI; and presenting a visual indication of the identified element in the second version of the GUI; obtaining user input, wherein the user input is indicative of whether the identified element corresponds to the GUI element; and updating the acquisition process based on the user input.

Optionally, the acquisition process is performed by applying a representation set representing the GUI element, wherein the representation set comprises a plurality of alternative representations, each of which provides an independent manner of identifying the GUI element in GUIs, wherein said applying the representation set comprises applying, independently, each alternative representation in at least a subset of the plurality of alternative representations, wherein said updating the acquisition process comprises updating the representation set.

Optionally, the acquisition process utilizes a detection model configured to detect an element in a target GUI that corresponds to the GUI element in the first version of the GUI, wherein the detection model is configured to receive a feature vector, wherein the feature vector comprises properties of the target GUI, wherein said updating the acquisition process comprises updating the detection model based on the user input.

Optionally, the acquisition process utilizes a similarity model, wherein the similarity model is configured to receive one or more properties of an original version of a GUI, one or more properties of a GUI element in the original version of the GUI, one or more properties of a new version of the GUI, and one or more properties of an element in the new version of the GUI, wherein the similarity model is configured to provide a similarity measurement regarding likelihood that the element in the new version of the GUI corresponds to the GUI element in the original version of the GUI, wherein said updating the acquisition process comprises updating the similarity model based on the user input.

Optionally, the acquisition process is based on a detection model of the GUI element in the first version of the GUI, wherein the detection model is generated using a model generator, wherein the model generator is configured to be provided with at least one or more properties of the first version of the GUI and one or more properties of the GUI element, wherein the method further comprises updating the model generator using the user input, the second version of the GUI and the identified element.

Optionally, the acquisition process is performed by identifying an element in the second version of the GUI using a representation of the GUI element; wherein said updating the acquisition process based on the user input comprises: updating the representation of the GUI element.

Optionally, the representation of the GUI element comprises a plurality of alternative representations of the GUI, wherein said updating the representation of the GUI element comprises: removing a subset of the plurality of alternative representation of the GUI from the representation of the GUI element.

Optionally, the subset of the plurality of alternative representations do not conform with the user input.

Optionally, the user input indicates that the element in the second version of the GUI does not correspond to the GUI element in the first version of the GUI, wherein the subset of the plurality of alternative representations are representation in which the element is identified in the second version of the GUI.

Optionally, the user input indicates that the element in the second version of the GUI corresponds to the GUI element in the first version of the GUI, wherein the subset of the plurality of alternative representations are representation in which the element is not identified in the second version of the GUI.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIG. 1 shows a schematic illustration of an exemplary environment and architecture in which the disclosed subject matter may be utilized, in accordance with some exemplary embodiments of the disclosed subject matter;

FIGS. 2, 3A, 3B, 4, and 5A-5D show flowchart diagrams of methods, in accordance with some exemplary embodiments of the disclosed subject matter;

DETAILED DESCRIPTION

Figure 1:
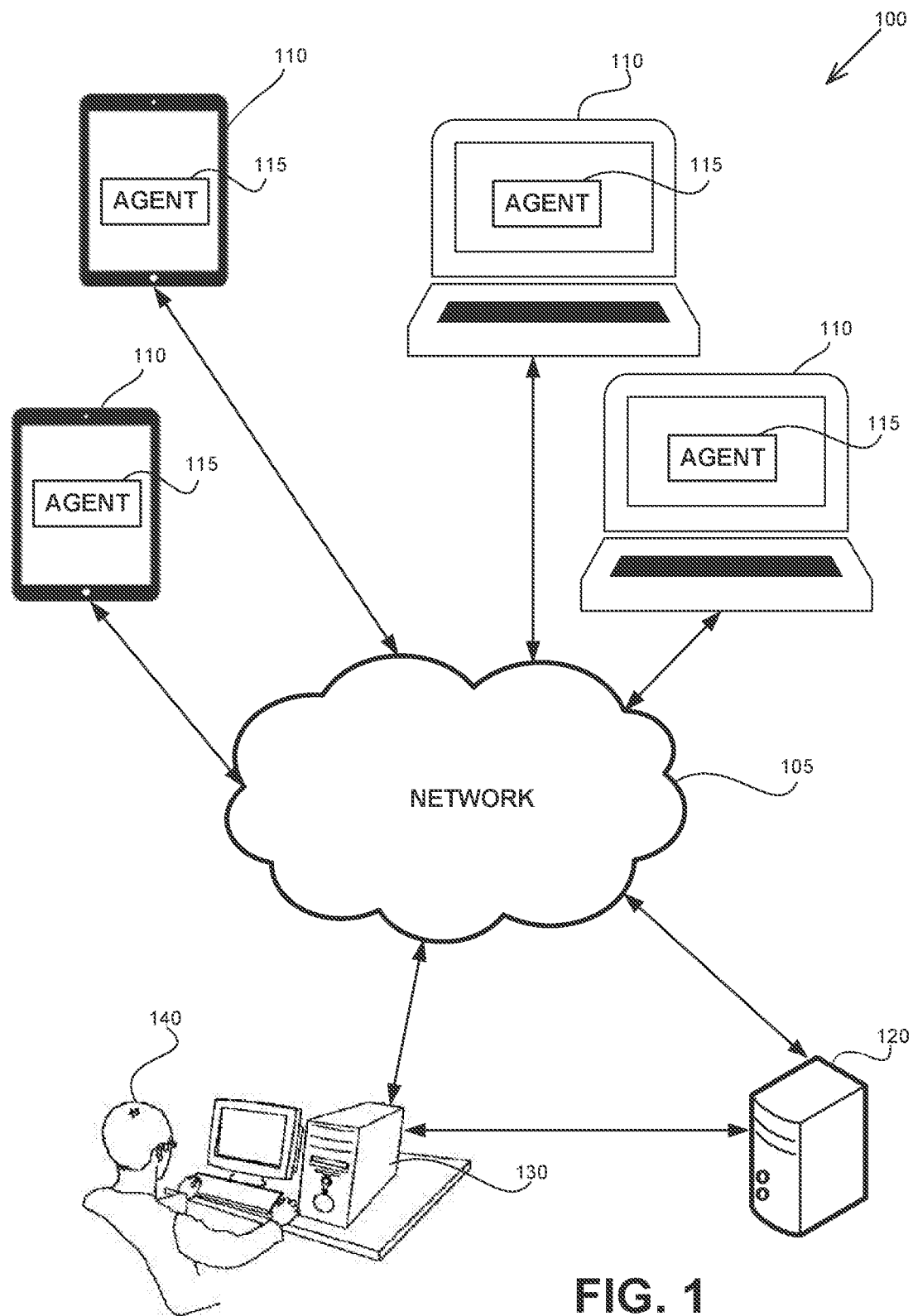

One technical problem dealt with by the disclosed subject matter is to represent a GUI element, preferably in a robust manner. In some exemplary embodiments, a GUI element may be a button, a label, a tooltip, a widget, an input field, a text box, or the like. It may be desired to automatically acquire a GUI element in a given GUI in order to allow execution of walkthroughs, gathering information for analytics, process automation, adding a display layer, augmenting functionality of the GUI, or the like.

In some exemplary embodiments, a GUI element is automatically acquired using an acquisition process if it can be identified within the GUI and referred to by automated means. Once an element is acquired, the GUI may be manipulated to modify properties of the acquired elements, such as its color, label, or the like. Additionally or alternatively, properties of an acquired element may be queried and investigated to be used for other purposes, such as displaying another element in a location adjacent the acquired element.

As an example, a walkthrough may be a tutorial which, when executed, presents, in a sequential manner, descriptive elements relating to the GUI, such as disclosed in U.S. Pat. No. 9,922,008, entitled "Calling Scripts Based Tutorials", which is hereby incorporated by reference in its entirety for all purposes without giving rise to disavowment. The descriptive elements may include instructions and/or examples of usage, and may be associated with respective GUI elements, such as a specific HTML object within a web document. In order to be able to place the descriptive element near the respective GUI element, there is a need to automatically acquire the GUI element. The acquisition of the GUI element may be based on a representation thereof. If, however, there is a change in the GUI, the representation may not be robust, and the acquisition may fail.

In some exemplary embodiments, a GUI element may not have a unique identifier in the GUI that is consistent over time. As an example, a button "OK" may not have any ID associated with it in the source code. There may be multiple buttons with the text "OK". Hence, it may not be feasible to acquire a button by searching for buttons with text "OK".

Additionally or alternatively, there may be different versions of a GUI, such as a web page, each of which may have different text. Hence, the button with text "OK" may be found by searching for the word "OK" in the English version of the web page and may not be found in other versions of the web page such as the German version, the Hebrew version, the Chinese version, or the like.

Additionally or alternatively, the code of the GUI may be dynamically obfuscated. For example, a web page may be obfuscated each time it is retrieved. As an example, a GUI element in a web page may have an "ID" property which is "send button" in the original source code. Each time the web page is retrieved, an obfuscator may choose a new and random ID property. Trying to acquire the GUI element based on the ID "send button" may be plausible during testing but may fail in production. Additionally or alternatively, as an obfuscator may provide a new ID each time the page is retrieved, a successful acquisition may not provide a hint as to an ID that can be used in future acquisitions.

Another technical problem dealt with by the disclosed subject matter is to provide a robust acquisition process of a GUI element in a program that changes over time. A program may change over time as a result of adding new features, removing features, design changes, bug fixes, or the like. It may be desired to acquire elements robustly, so as to find the same element over time. As an example, an application may have a "Pay Now" button. The application may change over time. For example, the "Pay Now" button may change place within the application, the size of the button may change, the text may change, or the like. It may be desired to collect usage information automatically regarding how many users have pressed the pay button, how many users have completed the payment, how long did it take for a user to complete the purchase, or the like. Such collected data may be used, for example, in providing useful funnel analysis of the program. Having a representation of the payment button may allow to acquire the payment button in the GUI, and identify interactions therewith. However, the representation may not be robust over time and may fail to allow acquisition of the same button, and therefore may miss interactions with the GUI button (and potentially account interactions with a different GUI element instead). Hence, a representation that is not robust over time may fail to provide a reliable automatic usage analysis. Similarly, a non-robust acquisition may create a technical challenge for automatic performance of user interactions, such as disclosed, for example, in the subject matter of U.S. Pat. No. 9,934,782, entitled "Automatic performance of user interaction operations on a computing device", which is hereby incorporated by reference in its entirety for all purposes and without giving rise to disavowment.

Yet another technical problem dealt with by the disclosed subject matter is to robustly acquire a GUI element in a program that changes over platforms. As an example, a program may have a native version for WINDOWS™ and a hybrid version for mobile devices. It may be desirable to robustly acquire a GUI element in a manner that will allow acquisition of the GUI element through the different versions.

One technical solution is to display, in combination, a first GUI with a visual indication of an element of interest therein, and a second GUI with a visual indication of an estimated corresponding element.

In some exemplary embodiments, a GUI of a program, such as a screen, a form, a web document, an ANDROID™ layout, an iOS™ playground object, or the like, may comprise a plurality of GUI elements, including a GUI element of interest. It may be estimated that another GUI version may also include the GUI element.

In some exemplary embodiments, the two GUIs may be presented to a user in parallel, such as in a side-by-side composition, where the GUIs are presented one next to the other, one above the other, or the like. The user may view the display and indicate whether the estimated corresponding element indeed corresponds to the element of interest. In some cases, the user may validate an estimated acquisition, may reject an estimated acquisition, explicitly indicate an alternative correct acquisition, or the like. In some exemplary embodiments, the input by the user may be used to update the acquisition process used with respect to the relevant GUI element. In some cases, the representation utilized by the acquisition process may be modified based on the user input. In some exemplary embodiments, the representation of the GUI element may comprise a set of alternative representations that can be applied independently of each other. The representation may be updated to remove any alternative representation that does not conform with the user input. For example, if the user verifies that the two elements correspond, any representation that would result in a different element than that displayed, may be removed. As another example, if the user rejects the suggested corresponding element, any alternative representation that provides the suggested corresponding element may be removed.

In some exemplary embodiments, the input by the user may be used to label the information, and the labeled information may be used to train a machine learning model, such as implemented using Artificial Neural Network (ANN), Deep Neural Network (DNN), Support Vector Machine (SVM), Decision Tree, or the like. The labeled data may be added to a training dataset that can be used to train machine learning models.

In some exemplary embodiments, in case the user rejects an estimated acquisition, an alternative acquisition for the same GUI may be provided for the user's review. In some exemplary embodiments, a representation set that yields an indefinite result, may provide two or more potential candidates. Each candidate may be reported as a potential candidate. In some exemplary embodiments, a confidence measurement, a ranking between the candidates, or the like, may be provided. For example, in case a representation set that comprises a plurality of alternative representation yields three different candidates: elements A, B and C, they may be ranked. Assuming 90% of the alternative representations indicated element A should be acquired, 7% of the alternative representations indicated element B, and 3%—element C, the candidates may be ranked accordingly: element A is the top-ranked element, followed by element B and the bottom-ranked element may be element C.

Additionally, or alternatively, the user may explicitly indicate the correct alternative acquisition manually, e.g., by selecting the correct element, such as using a mouse pointer, a pointing device, a touch screen, or the like.

Another technical solution is to utilize a machine learning model to learn, based on a training dataset, how to acquire an element in a new GUI based on an existing GUI and an identification of the element therein.

In some exemplary embodiments, the machine learning model may be configured to receive a feature vector and provide a label. In some exemplary embodiments, the feature vector may comprise a first sub-vector representing a first GUI, a second sub-vector representing a second GUI, and a third sub-vector representing the element of interest in the first GUI. Additionally, or alternatively, the third sub-vector may provide the properties used to represent the element of interest (e.g., the representation, a representation set, or the like). In some exemplary embodiments, the label may be a label indicating the properties or identity of the element of interest in the second GUI. Additionally, or alternatively, the feature vector may comprise a first sub-vector representing a first GUI, a second sub-vector representing a second GUI, a third sub-vector representing the element of interest in the first GUI, and a fourth sub-vector representing a candidate element in the second GUI. The label may provide a confidence measurement whether the candidate element corresponds to the element of interest. In some exemplary embodiments, the feature vector may comprise features associated with screens, GUI elements, GUI contexts, or the like.

In some exemplary embodiments, a machine learning model may be utilized to identify the element of interest in the other version of the GUI. In some cases, a candidate may be presented to the machine learning model, and the model may provide a confidence measurement on the likelihood that the candidate indeed corresponds to the element of interest in the original GUI.

In some exemplary embodiments, acquisition of the element may be attempted using a representation of the GUI element, such as a representation set, as is disclosed in detail in International Patent Application No. PCT/IL2019/050475, entitled "GUI ELEMENT ACQUISITION USING A PLURALITY OF ALTERNATIVE REPRESENTATIONS OF THE GUI ELEMENT", filed Apr. 30, 2019, which is hereby incorporated in reference in its entirety without giving rise to disavowment. The representation set may comprise a plurality of alternative representations. In some exemplary embodiments, the representation set may be applied on the screen, where the GUI element is to be acquired, by independently applying each of the alternative representations. In some exemplary embodiments, each of the alternative representations may be sufficient to uniquely identify the GUI element. The representation set may be considered as providing a definite result if the results of the alternative representations are in agreement and identify a single element in the screen. Otherwise, the representation set may be viewed as providing indefinite result.

In some exemplary embodiments, a representation may use an attribute of the GUI element to identify the GUI element. The attribute may be an identifier of the element, a text associated with the element, the color of the element, or the like. Additionally or alternatively, a representation may use an absolute path to the GUI element in a hierarchy of GUI elements in the screen. In some exemplary embodiments, a GUI element may comprise one or more sub-GUI elements. GUI elements may be represented in a Directed Acyclic Graph (DAG), a tree, or another form of a graph. The GUI may comprise a root element, and a path from the root element to the GUI element may be considered as an absolute path thereto. Additionally or alternatively, a representation may use a relative path from a source GUI element to the target GUI element. A relative path to a GUI element may be the path from a source GUI element to the target GUI element. Such representation may allow to acquire the target GUI element, based on an acquisition of the source GUI element. In some exemplary embodiments, a representation may use one or more attributes of one or more other GUI elements to represent the GUI element. For example, a representation may use a query to identify other elements or structures, and select the GUI element therebetween based on a property, such as structural property, attribute of the element, or the like. As an example, an alternative representation may be "find an element which is the deepest root of sub-tree containing elements with attributes <A1> and <A2>". In this example, all sub-trees containing an element with attribute <A1> and an element with attribute <A2> (which may be the same element or a different element), may be identified. Each root of such sub-trees may be examined, and the node that functions as a root of such sub-tree and has a largest distance from the root of the tree representing the GUI may be selected.

In some exemplary embodiments, a Document Object Model (DOM) may provide a tree structure representation for a GUI, such as a GUI based on an HTML, a XHTML, or a XML document. In the logical tree structure of the DOM, each node may be an object representing a part of the document. DOM may be utilized to traverse a desired path in the GUI.

Yet another technical solution may comprise a utilization of a similarity model. The similarity model may be implemented using or without using machine learning. The similarity model may be configured to receive a first element and a second element, and determine their similarity. In some exemplary embodiments, a similarity metric may be associated with a confidence that the two elements are the same. As an example, the similarity metric may be a distance metric where the value "0" is provided when the two elements are identical. Additionally or alternatively, the similarity model may be provided with a first GUI and a second GUI, where the first element is comprised by the first GUI and the second element is comprised by the second GUI. The similarity model may be configured to determine similarity between the two elements, in view of the GUIs in which they are located. In some exemplary embodiments, an acquisition process may utilize a similarity model, such as by applying the similarity model to identify the element that is most similar to the element to be acquired. Such identified element may be the acquired element. In some exemplary embodiments, the similarity model may be implemented using machine learning models, such as a machine learning model providing a confidence measurement as is described herein. The similarity model may be updated based on user-provided input, indicating whether past acquisition processes were successful or not.

Yet another technical solution may comprise utilization of a detection model. The detection model may be configured to detect an element in a GUI that corresponds to an original element in an original GUI. The detection model may receive a feature vector representing the GUI in which detection is desired. In some exemplary embodiments, different detection models may be provided for different elements. In some exemplary embodiments, each detection model may be based, internally, on the properties of the original GUI, the original element, or the like.

In some exemplary embodiments, the detection model may be utilized to perform the acquisition process. Input regarding past acquisition processes may be utilized to update the detection model. In some exemplary embodiments, the detection model may or may not be implemented using machine learning. In an embodiment where machine learning is utilized, the detection model may be a trained model that is trained to identify the element for acquisition in a GUI. The model may be re-trained based on labeled data provided in accordance with the disclosed subject matter.

Yet another technical solution may comprise utilizing a model generator to generate a detection model to be used to perform acquisition of a GUI element in a GUI. User-provided information may be utilized to update the model generator to improve future detection models generated thereby. The user input may be input indicating whether an element detected using a detection model that was generated by the model generator, is indeed the correct element or an incorrect element.

Yet another technical solution may comprise a plurality of client devices that record GUIs. The client devices may attempt performing acquisitions of the element of interest in the GUI they encounter. In some exemplary embodiments, all acquisition attempts—successful or non-successful—are reported to a server. Additionally, or alternatively, only unsuccessful acquisition attempts are reported to the server. Additionally, or alternatively, successful acquisition attempts having a confidence measurement below a threshold may be reported to the server. Based on reported acquisition attempts, resolution entries may be created or updated in a repository. The server may retrieve resolution entries and display such resolution entries to a human user, in an attempt to obtain guidance therefrom. Based on the guidance of the user, the resolution entries may be resolved, snoozed or indicated to be ignored. The user information may be utilized to train a machine learning model, to update a similarity model, to update a detection model, to update a model generator, or the like. Additionally, or alternatively, the user information may be utilized to provide guidance for future resolutions to be performed. In some cases, the updated model itself may be distributed to the client devices to be utilized thereby. The model may be refined, improved as information is gathered, and re-distributed. Additionally, or alternatively, using the model, a robust representation of elements of interest may be determined and provided to the client devices, such as to enable performing robust acquisition over time and over different computerized environments.

In some exemplary embodiments, an end user may use a browser running on the client device, an application running on the client device, or the like. In some exemplary embodiments, an agent running on the client device may obtain a representation of an element. Additionally or alternatively, the agent may apply the representation on screen currently being watched by the end user. The agent may utilize the representation in order to acquire the GUI element for performing a predetermined process. The agent may determine that applying the representation provided an indefinite result. In response to determining that applying the representation provided an indefinite result, the agent may communicate the information to a server. The server may be configured to modify the representation as to determine the modified representation set. In some exemplary embodiments, the agent may obtain the modified representation from the server for future uses. Such modification may be provided in a delayed timing, such as within a day, a week, or the like, and after a user had attended to a resolution entry representing the indefinite resolution the agent encountered. In some exemplary embodiments, the server may distribute, in a push or pull manner, the modified representation to a plurality of agents that may be configured to acquire the GUI element.

In some exemplary embodiments, the agent may be crawlers, scripts, software products, bots, user-operated clients or the like. In some exemplary embodiments, the agent may be a user-operated client, where the user may instruct the client to save a specific screen encountered by the user in a session. Additionally, or alternatively, the agent may report websites visited by the user without the user's instruction. Additionally, or alternatively, the agent may crawl websites and report website autonomously. An agent may be executed on a client device and communicate the information to a server. The server may store the information in order to use the information in accordance with the disclosed subject matter.

In some exemplary embodiments, in response to determining that applying the representation set provided an indefinite result, the GUI may be displayed to a user. In some exemplary embodiments, the user may be an administrative user, different than the end user using the device in which the acquisition was performed. The user may identify the GUI element in the GUI, select the GUI element in the GUI, mark the GUI element in the GUI, or the like. In some exemplary embodiments, in case that the indefinite result comprises more than one GUI element, the GUI elements identified by the representation set may be displayed to the user. The user may select one GUI element therebetween. Additionally or alternatively, a computerized process may automatically select a top candidate out of the more than one GUI element, and allow the user to verify the automatic selection. The server may store the selection of the user, modify the representation based thereon, or the like. In some exemplary embodiments, selections of users may be recorded and saved for a future use. As an example, selection of the user may be used as parts of data for a supervised machine learning algorithm.

One technical effect of utilizing the disclosed subject matter is a robust acquisition of a GUI element. In some exemplary embodiments, the acquisition may be accomplished automatically by an agent. The agent may be configured to perform a useful process using the acquired element, such as displaying and executing a walkthrough, providing an augmented display over the GUI, analyzing the actions of the user or users, executing testing automation, or the like. The robust acquisition may be performed with respect to different versions of the program, different version of the GUI, or the like, without requiring manual intervention or assistance.

Another technical effect of utilizing the disclosed subject matter is to determine a robust representation of a GUI element. A GUI of a program may change over time due to changes in versions, in UX, in functionality of the program, or the like. Utilizing the disclosed subject matter may enable to acquire a GUI element in the GUI, even if the GUI had changed from the GUI that was available when the representation was defined. In some exemplary embodiments, a GUI element may change, a GUI of a program comprising the GUI element may change, or the like. As an example, a GUI element may be acquired by using a text that is associated with the GUI element. The GUI element may be button comprising the text "Like". A new version of the GUI of a program may change the text to another language, to an icon, or the like. The disclosed subject matter may provide a method to acquire the GUI element regardless of such changes.

Yet another technical effect of utilizing the disclosed subject matter is to enable automation processes of programs, such as execution of business processes using the GUI without using dedicated Application Programming Interfaces (APIs), testing automation, or the like. Robust acquisition of GUI elements may enable the automation process to function correctly, and thus reduce resources required for re-execution after manual inspection of error.

Yet another technical effect of utilizing the disclosed subject matter may be to enable automatic modification of a GUI representation, without user intervention. Using machine learning techniques, the disclosed subject matter may define the representation automatically. Additionally or alternatively, even when the representation set may fail and provide an indefinite result, the disclosed subject matter may provide for an automated manner of correcting the representation to provide a definite result and acquire the target GUI element correctly.

Yet another technical effect of utilizing the disclosed subject matter is to enable enhancement of the GUI, such as augmenting functionality thereof, providing adaptable walkthroughs thereto, adding display layer over the GUI, collecting usage statistics, or the like. The GUI enhancement may require automatic acquisition of GUI elements. The disclosed subject matter may provide a robust acquisition, enabling GUI enhancements to function properly over time, in spite of changes to the GUI.

Yet another technical effect of utilizing the disclosed subject matter may be an improvement of resource consumption in the process of utilizing a representation of GUI elements. The disclosed subject matter may provide a representation that is durable over time, and avoid the need to manually redefine a representation with each modification of the GUI, or for each alternative version of the GUI, such as in case of different languages, different platforms, or the like.

Yet another technical effect is the generation of a predictive model that is capable of predicting modifications in GUIs and websites, identification of elements in a precise and accurate manner in modifications of the GUIs and websites, or the like. The predictive model may implicitly model how GUIs change over time and may be used to identify trends in GUI design. The predictive model may be used as a basis for proposing automated modifications of a GUI, based on how similar GUIs were modified.

Yet another technical effect is the compilation of a large corpus of information useful for training the machine learning model in an iterative manner, that is feasible for deployment in a real-life implementation. The information may be gathered while the system is operating and without the system being contingent on manual operation to operate. Instead, the system may be operated as is, and the information that it gathers may be utilized for manual labeling by users. Each manual labeling may also have a useful application on the system, and may thus be performed for its sake, and not for the sake of training the machine learning model.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1 showing an environment, in accordance with some exemplary embodiments of the disclosed subject matter.

Environment 100 may comprise a plurality of Client Devices 110. Client Devices 110 may by Personal Computers (PCs), tablets, smartphones, or the like. Client Devices 110 may be connected to a Computerized Network 105, such as a Wide Area Network (WAN), a Local Area Network (LAN), a wireless network, the Internet, an intranet, or the like.

Environment 100 may comprise Server 120, which may be connected to Computerized Network 105. Additionally or alternatively, Administrator Computer 130, such as a desktop computer, a mobile phone, a tablet computer, or the like, operated by Administrator 140 or another user with suitable credentials and permissions, may be connected to Computerized Network 105. In some exemplary embodiments, Server 120 and Administrator Computer 130 may be connected to each other directly, indirectly, such as via Computerized Network 105, or the like. In some exemplary embodiments, Server 120 and Administrator Computer 130 may be implemented by the same physical device.

In some exemplary embodiments, an Agent 115 may be running on a Client Device 110. In some exemplary embodiments, each Client Device 110 may execute a corresponding Agent 115. Additionally or alternatively, only a portion of Client Devices 110 may execute an Agent 115. Agent 115 may be a program product executable by a computer, such as, without limitations, a script, a software, a browser extension, a mobile application, a web application, a Software Development Kit (SDK), a shared library, a Dynamic Link Library (DLL), or the like.

Client Device 110 may be configured to execute a program having a GUI. The program may be, for example, a web page, a web application, a browser extension, a mobile application, desktop application, or the like. The program may display to an end-user one or more screens, constituting the GUI, which comprise GUI elements.

In some exemplary embodiments, Agent 115 may be configured to perform an acquisition process to identify a GUI element appearing in the GUI. For example, Agent 115 may acquire a specific interactive button, a text element, a tool tip, or the like. The GUI element acquisition process may be performed to enable Agent 115 to implement a desired functionality. In some exemplary embodiments, Agent 115 may track user activity with respect to the program, and in particular, monitor usage statistics relating to GUI element. Additionally or alternatively, Agent 115 may implement GUI-based automation, automatically interacting with the GUI on behalf of the end-user, mimicking user-input. Additionally or alternatively, Agent 115 may implement GUI manipulation, such as modifying the GUI, removing existing GUI elements, adding new GUI elements, or the like. Additionally or alternatively, Agent 115 may implement a walkthrough, in which elements of the walkthrough may be displayed in a location adjacent GUI elements, provide call for actions for the end user, relating to GUI elements displayed in the GUI, or the like.

In some exemplary embodiments, Agent 115 may be configured to obtain a representation of the GUI element. Agent 115 may apply the representation on the GUI, so as to acquire the GUI element in the GUI. In some exemplary embodiments, applying the representation may fail to identify any GUI element in the GUI. Additionally or alternatively, applying the representation may provide indefinite results due to identifying a two or more candidate elements.

As an example, it may be desired to acquire a "new" button appearing in the GUI and relating to composing a new email, which appears in the email container. In some exemplary embodiments, one representation that may be used to acquire the GUI element, may be to search for an element having the properties "Type=Button" and "Label=new". Another alternative representation may be an element having the properties "Type=Button" and "Parent=Email Container". A representation set may comprise both alternative representations, each of which may be sufficient to identify the GUI element. However, in some exemplary embodiments, the GUI may comprise a plurality of containers, such as email container, contact container, event container, or the like, each of which may comprise a "new" button. As a result, the first alternative representation may provide three different GUI elements when applied on the GUI, as there may be three different elements that match the properties defined thereby. The second alternative representation may still provide a unique result—the GUI element. Such discrepancy may be considered as the representation set providing an indefinite result. As another example, the representation may be based on "Type=Button" and "Parent=Email Container" properties alone and identify a single element. However, due to the discrepancy in other properties of the element, such as a label being "cancel" instead of "new", a confidence measurement may be computed to be below a predetermined threshold, and the acquisition may be considered as potentially erroneous.

In some exemplary embodiments, Agent 115 may communicate information regarding acquisitions to Server 120. In some exemplary embodiments, Agent 115 may report indefinite acquisitions, acquisitions having confidence measurement below a threshold, or the like. In some exemplary embodiments, Server 120 may be configured to obtain such information, and utilize the information in accordance with the disclosed subject matter. In some exemplary embodiments, over time, when a user addresses the reported acquisition, the representation may be modified by Server 120 and potentially distributed to clients that may attempt acquiring the relevant element.

In some exemplary embodiments, applying a representation may not successfully acquire an element, such as by failing to provide a result, providing an empty result, or the like. It is noted that such representation may be correct. As an example, a feature may be available in one Operating System (OS) and not available in another. A first version of the GUI may have been identical for two different OSs. The feature may be represented using a button. The first version of the GUI may comprise the button in all OSs. A second version of the GUI may be OS specific and may include the button for one OS and not include the button for another OS. Applying the representation on the first version of the GUI may provide the button regardless from which OS the GUI was obtained. Applying the representation on the second version of the GUI may provide the button when the GUI is obtained from a first OS. Additionally or alternatively, applying the representation on the GUI that was obtained from a second OS may not provide a result, as the GUI element is indeed absent from that GUI.

In some exemplary embodiments, Server 120 may retain GUIs. In some exemplary embodiments, Agents 115 may be configured to transmit to Server 120 GUIs encountered thereby. In some exemplary embodiments, each encountered GUI may be transmitted. Additionally or alternatively, GUIs where the acquisition was performed or can be performed may be transmitted. In some exemplary embodiments, GUIs where acquisition was performed unsuccessfully, or successfully but with a relatively low confidence score, may be provided to the server. In some exemplary embodiments, a GUI that is retained may be a digital representation of the displayed GUI, such as an Hyper Text Markup Language (HTML) document, a screen capture image, eXtensible Markup Language (XML) document representing the elements of the GUI and their properties, a Document Object Module (DOM) file, ANDROID™ layout, or any other digital representation of the GUI.

In some exemplary embodiments, Agents 115 may provide resolution queries to Server 120. A resolution query may comprise an original GUI, element of interest therein, and another GUI, or representations thereof. In some exemplary embodiments, the resolution query may further comprise a candidate element in the other GUI. In some exemplary embodiments, the resolution query may be provided so as to request acquisition of the element in the other GUI that corresponds to the element of interest in the original GUI. In some exemplary embodiments, in response to an Agent 115 attempting to acquire an element, a plurality of candidates may be identified. For each candidate a separate query may be issued, so as to provide a set of queries having the same original GUI, the same element of interest, the same other GUI, but a different candidate element. In some exemplary embodiments, based on the resolution query, a resolution data repository may be searched. In some exemplary embodiments, the server may lookup a resolution entry in the data repository that matches the resolution query. The entry may exist from previous queries and potentially has been previously resolved, in accordance with the disclosed subject matter. If the entry does not exist, a new entry may be added to the repository. If the entry exists, a counter counting a number of times the resolution was encountered may be increased. Additionally, or alternatively, if the entry was previously resolved, a label may already be available and the result may be known. Otherwise, if the entry was not resolved, but the entry was in a "snooze" status, the entry may be reopened for manual resolution, in accordance with the disclosed subject matter. In some exemplary embodiments, if a query regarding a resolution that was previously resolved and labeled as an incorrect candidate acquisition is encountered, a flag may be raised, so as to determine how come a previously identified wrong acquisition has been attempted again by one of Agents 115. In some cases, if Agent 115 that issued the query utilized an outdated representation, such a flag may trigger a forced update of the representation in Agent 115 to prevent future unsuccessful acquisitions.

Environment 100 may comprise Administrator Computer 130 and User 140 that may be an operator, a supervisor, an administrator, or the like. In some exemplary embodiments, Administrator Computer 130 may be configured to display the information to Administrator 140, based on the resolution data storage. Additionally or alternatively, Administrator Computer 130 may be configured to display to Administrator 140 the GUI, as captured by Agent 115 that is associated with the resolution query. User 140 may make a selection of the GUI element in the displayed GUI. In some exemplary embodiments, a side-by-side display may be presented showing both the original GUI, with a visual indication of the element of interest, and the GUI in which the element is to be acquired. In some cases, the candidate element may be visually presented in the other GUI, enabling Administrator 140 to accept or reject the candidate. In response to obtaining from Administrator 140 the user input indicating the element to be acquired in the other GUI, the information may be retained for future usage. Additionally, or alternatively, the information may be provided to a machine learning tool for training, as labeled data.

Additionally or alternatively, Administrator Computer 130 may be configured to display to Administrator 140, the original GUI, with a visual indication of the GUI element, as identified by the representation. The display may further include the current GUI, in which acquisition is to be performed. In some exemplary embodiments, the display may show the original GUI and the current GUI in a side-by-side manner, enabling Administrator 140 to visually view both GUIs at the same time, compare them, and identify the correlation between the elements thereof.

Additionally or alternatively, the display may comprise a visual indication of a candidate of the GUI element. The candidate may be determined, for example, automatically at the server-side. For example, the candidate may be determined based on a majority of the alternative representations in a representation set. Additionally or alternatively, each alternative representation may be associated with a weight and based on the weights, a score for each candidate may be computed, enabling a selection of a top-scored candidate. Additionally or alternatively, a prediction model may be utilized to determine a predicted selection. In some exemplary embodiments, the candidate element may be provided as part of the resolution query, such as provided based on computation or determination made by Agent 115. For example, in case the query is a result of an indefinite resolution of a candidate set in which two potential candidates are identified, the query may indicate the most likely candidate. Additionally, or alternatively, two queries may be issued, each with a different candidate. Additionally, or alternatively, the query may indicate each of the potential candidates.

In some exemplary embodiments, the display may by centered on the estimated GUI element, such as setting scrolling bars in a position to show the candidate element. Additionally, or alternatively, the original GUI may be similarly centered on the element of interest. In some exemplary embodiments, the centering of the GUI may comprise setting the GUI in a manner in which the displayed portion of the GUI, that is visible to the user, includes the relevant element. In some cases, the relevant element is located in a centered height, centered width, or combination thereof, of the displayed portion.

In some exemplary embodiments, Administrator 140 may verify whether the estimation of GUI element is correct, or alternatively indicate it is incorrect. In some exemplary embodiments, in response to an indication of an incorrect estimation, a next-best estimation may be displayed, and so forth. Additionally or alternatively, upon displaying the next estimated candidate, the display may be re-centered on the next estimated candidate. Additionally or alternatively, Administrator 140 may manually select the GUI element in an explicit manner. In some exemplary embodiments, user input may be used by a machine learning algorithm, such as supervised learning, semi-supervised learning, non-supervised learning, or the like, to provide a predictive model capable of replacing a human user by an automated classifier.

In some exemplary embodiments, Server 120 may update the representation of the element of interest and distribute it to Agents 115, thereby updating the acquisition process. In some exemplary embodiments, Agent 115 may be configured to obtain the modified representation and utilize it as the representation for acquiring the GUI element. In some exemplary embodiments, Agent 115 may apply the modified representation on the current GUI or on additional GUIs.

In some exemplary embodiments, attempts to apply the representation may be retained and used by a machine learning algorithm, so as to allow improved selection of representations to be used. The improved selection may take into account properties of the GUI element, the properties of the representation being examined and use a predictive model to estimate robustness of the examined representation over time. Additionally or alternatively, the improved selection may take into account other representations that uniquely identify the GUI element as part of the features used to estimate the robustness of the representation. Additionally or alternatively, the improved selection may take into account other representations that provided indefinite results (of specific type, or in general), representations that were exhibited to be non-robust (e.g., initially provided a unique identification and later on provided a non-unique identification), or the like. Additionally or alternatively, the improved selection may take into account GUI context, properties of the GUI, or the like.

In some exemplary embodiments, a GUI may be associated with a GUI context. The GUI context may be properties relating to the GUI, to the user using the GUI, to the device being used to execute the GUI, to the connectivity status of the device, or the like. As an example, GUI context may comprise an Operating System (OS) of the device being used. As another example, the GUI context may comprise a locale of the device, such as language settings, regional location, time zones, or the like. As yet another example, the GUI context may comprise an identifier of the GUI, such as a Unified Resource Identifier (URI), a screen name, or the like. As yet another example, the GUI context may comprise properties of the logged-in user, such as permissions, settings, roles, or the like. As yet another example, the GUI context may comprise hardware properties of the device, such as screen size, orientation, resolution, network connectivity, or the like. In some exemplary embodiments, a first Agent 115, running on a first Client Device 110, may uniquely identify a GUI element, while a second Agent 115, running on a second Client Device 110, may provide indefinite result for the same GUI, due to a difference in the GUI context.

Figure 2:
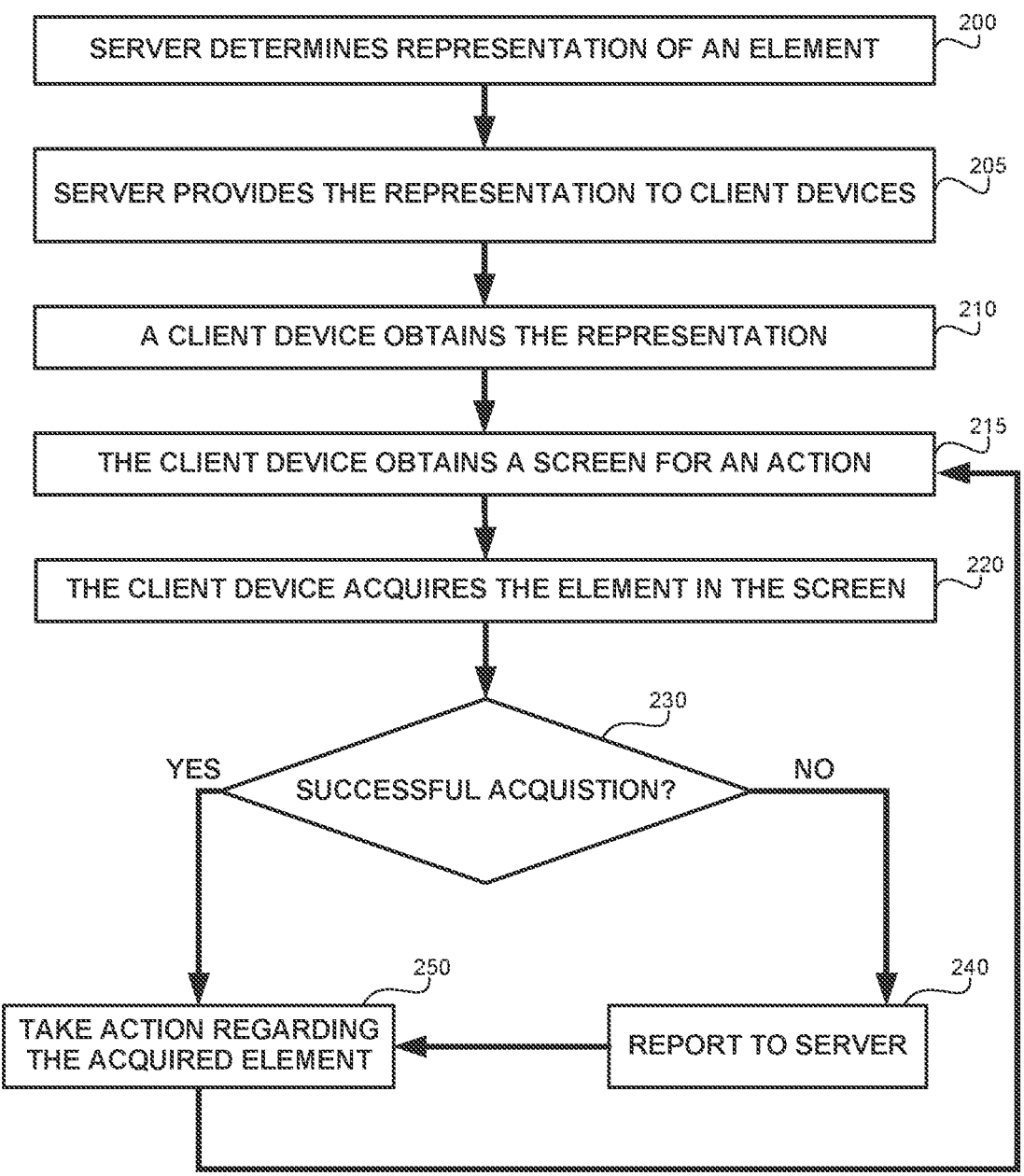

Referring now to FIG. 2 showing a flowchart diagram of a method, in accordance with some exemplary embodiments of the disclosed subject matter.

On Step 200, a representation of a GUI element is determined. In some exemplary embodiments, a server may determine the representation to be used for acquiring the GUI element for preforming, in the future, an action by a client device.

The representation may be a single atomic representation. Additionally, or alternatively, the representation may be a representation set that comprises a plurality of alternative representations, each of which may provide a manner of identifying the GUI element in the GUI of a program.

An element of a GUI, also referred to as a screen, may be selected to be used as part of an automation process, of a walkthrough, or the like. Additionally or alternatively, the selection of the element may be performed automatically, relating to elements of interest, such as elements for which performance measurements may be tracked. In some exemplary embodiments, the GUI element may be a GUI element that may be acquired in the future, such as when the program having the GUI is invoked.

In some exemplary embodiments, the selected element may be represented in a digital form, such as using a pointer to the GUI element in an application, an identifier of the GUI element in a web page, or the like. The GUI may part of a program, such as a mobile application, a web application, a desktop software, or the like. Additionally or alternatively, the GUI may be a screen previously presented by a program and retained in a database.

As an example, in some situations, when rendered, the GUI of a program may be Google™ home page. The GUI element may be the search area in which users may type a text. The search area may be obtained by searching for "div id=searchBox". As another example, the GUI may be a screen in a Google™ Search mobile application, instead of a web application. The screen may comprise a GUI element such as a search box, which may be identified as "androidid="searchBox"".

In some exemplary embodiments, the search box may have alternative representations that can be used to identify the selected GUI element, such as "div id=searchBox", "GUI element with the text 'Search Google or type a URL'", "the $7^{th}$ div in the page", or the like.

On Step 205, the server may provide the representation to a plurality of client devices. In some exemplary embodiments, the server may transmit the representation to each of the client agents, such as Agents 115 of FIG. 1. Additionally, or alternatively, the server may provide the representation using broadcasting, multicasting, unicasting, or the like. Additionally or alternatively, the server may store the representation on a data storage that is accessible to the client devices, thereby allowing the client devices to retrieve the representation, in a pull model. It is noted that the broadcasting by the server may also include transmitting the representation individually, making the representation available to be accessed by the client devices, or the like.

On Step 210, a client device may obtain the representation. The representation may be obtained from the server, directly or indirectly. The representation may be obtained a result of the server providing the representation on Step 205.

On Step 215, a client device may obtain a screen or another GUI. The screen may be obtained for the purpose of performing an action, such as but not limited to, tracking usage of the screen, presenting a digital walkthrough, performing an automated process, performing automated testing, modifying the visual representation of the screen, presenting another display layer over the screen, augmenting the functionality of the screen, performing analytics, or the like. In some exemplary embodiments, the action may be performed with respect to a GUI element of the screen. In some exemplary embodiments, the screen may be obtained by an agent such as Agent 115 of FIG. 1.

On Step 220, the client device may attempt to acquire to element in the screen obtained in Step 215. In some exemplary embodiments, the acquisition may be performed by applying the representation that was obtained in Step 210.

In some exemplary embodiments, the representation may be representation set. Applying the representation set may comprise applying each of the alternative representations comprised by the representation set. The results of said applying each of the alternative representations may be retained and compared to one another.

In some exemplary embodiments, some alternative representations may be associated with a GUI context. As an example, the GUI context may comprise a property describing the OS from which the GUI was obtained. The property may be "OS=ANDROID™", "OS=WINDOWS", or the like. Applying the representation set may comprise selecting a subset of the alternative representations based on the GUI context and applying only the subset, for the purpose of uniquely identifying the GUI element. Referring again to the above example, the homepage of Google™ may be displayed differently for ANDROID™ smartphones. As an example, the search box may be placed in the $8^{th}$ div element and the id may be "searchBox_android". Applying the alternative representation "div id=searchBox" on the updated web page, may not provide any GUI element when the GUI context comprises OS=ANDROID. Additionally or alternatively, the alternative representation "the $7^{th}$ div in the page" may provide a different GUI element than the search box, and should not be used when the GUI context comprises OS=ANDROID. In some cases, for OS=ANDROID, different alternative representations may be available, such as "the $8^{th}$ div in the page", "div id=searchBox_android", or the like. Furthermore, the alternative representation "GUI element with the text 'Search Google or type a URL'" may be applicable to all operating systems and indifferent to the property of OS type in the GUI context. As a result, this alternative representation may be applied for both OS=ANDROID GUI context as well as OS=WINDOWS GUI Context.

In some exemplary embodiments, a detection model may be determined in Step 200, provided to client devices in Steps 210-215 and applied in Step 220 as part of the acquisition process. In some exemplary embodiments, a model generator may be utilized to generate the detection model. In some exemplary embodiments, The detection model may be utilized in addition to or instead of the representation of the element.

On Step 230, it may be determined whether the acquisition was successful or not.

In some exemplary embodiments, in case the acquisition was not successful, the client device may report to the server (Step 240). In some exemplary embodiments, the report may be a resolution query, comprising the information regarding the current GUI (e.g., screen obtained in Step 215), and the information regarding the original GUI and element of interest therein whose acquisition attempt in the current GUI had failed. In some exemplary embodiments, the report may comprise indication of candidate element in the current GUI. Additionally, or alternatively, the report may indicate confidence scores measuring confidence in each potential candidate. In some exemplary embodiments, the report may comprise the screen, the GUI context, the representation that was applied, the results of applying the representation, or the like. In some exemplary embodiments, the information may be provided to the server, so as to improve the representation. Additionally or alternatively, the server may retain the information to be used by a machine learning algorithm, for quality assurance, for updating the detection model, or the like. Additionally, or alternatively, the report may indicate an identifier of the original GUI, original element of interest, or the like, which may be accessible to the server, such as via a repository or data storage.

It is noted that the original GUI may be a screen comprising the original GUI element. The original screen may be the screen using which the representation the GUI element was originally determined. In some exemplary embodiments, the original screen may be an historic screen, that is no longer relevant. In some cases, the original screen may be replaced by another historic screen, such as after a major release, modifications caused by an operation system update, or the like. The screen that replaces the original screen may be used instead of the original screen to ensure robustness over time, such as replaced periodically.

In case the acquisition was successful, Step 250 may be performed. Additionally or alternatively, in case the acquisition was unsuccessful, such as the representation set provided an indefinite result, an estimated acquired element may be selected and Step 250 may be performed with respect to the estimated acquired element, such as based on a selection criteria, e.g., majority vote, weighted selection, or the like. For example, if acquisition provided a plurality of candidates, a top-rated candidate may be selected, and the action may be performed thereon. It is noted that the action may be taken on the client device with respect to an estimated acquired element, which may or may not be the correct GUI element. The action may be taken without human intervention, which may not be immediate. For example, a human user may review the issue and indicate the correct element within a reasonable timeframe, such as, 5 minutes, an hour, 24 hours, 72 hours, 2 weeks, or the like. The client device may require an immediate acquisition, on the fly, of the GUI element, for its purposes. Such acquisition may be performed using the estimation, which may be available immediately. Although this may provide for non-optimal results on the client-side, this may allow the client device to perform its intended functionality, and avoid requiring human intervention. In some cases, the acquisition would be erroneous and the results—incorrect. However, this may occur in a relatively small percentage of the cases, and in most cases, the system as a whole would function properly. It is also noted that if a specific acquisition issue persists and becomes widespread, the server may receive reports thereon and may issue an alert, such as based on an identified trend, an identified exceeded threshold of reports regarding a specific element, a specific screen, or the like.

In some exemplary embodiments, reports may be transmitted to the server (Step 240) even in the case of acquisition that is deemed successful by the client device. Successful acquisitions may be reported for tracking statistics about success/failure rates, trends, or the like. In some exemplary embodiments, human users may be asked to validate results that are considered successful.

It is noted that based on reports, modified representation may be determined in the server. Such modified representation may be utilized in future occurrences where acquisition is performed. Additionally or alternatively, modified detection models may be determined based on the reports. Additionally or alternatively, the model generator may be updated and improved to provide a more robust detection models in the future, thereby affect the acquisition process of the same element or of different elements.

In some exemplary embodiments, Steps 215-250 may be repeatedly performed. Additionally, or alternatively, Steps 210-250 may be repeatedly performed. In some cases, the client device may utilize a web browser and which each browsed page, Steps 210-250 may be performed with respect to the browsed page and to the elements therein for which acquisition is performed.

Figure 3A:
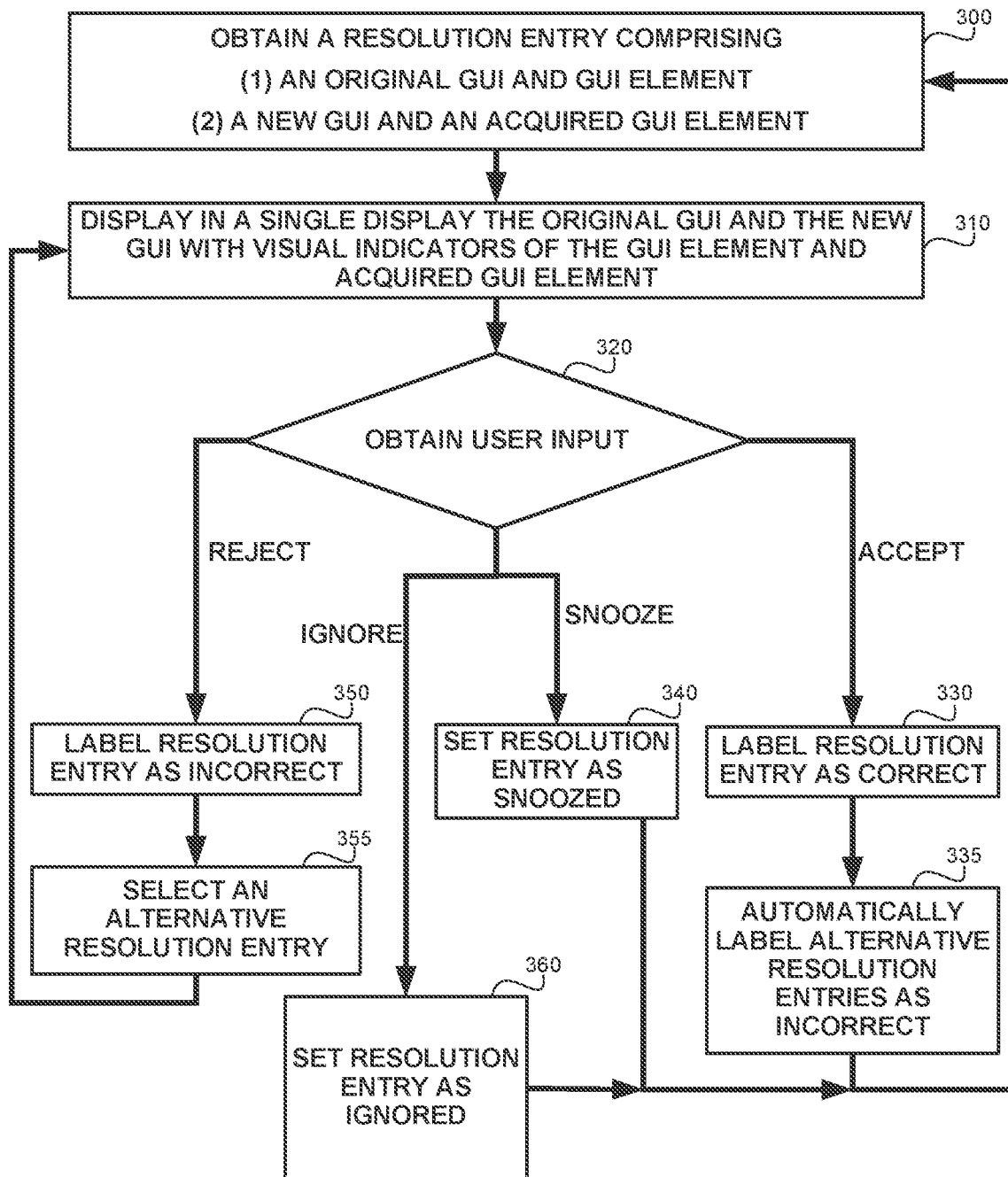

Referring now to FIG. 3A showing a flowchart diagram of a method, in accordance with some exemplary embodiments of the disclosed subject matter.

On Step 300, a resolution entry may be obtained. The resolution entry may be obtained from a database, a repository, a data storage, or the like. The resolution entry may comprise an original GUI and a GUI element therein, that is deemed the element of interest of the resolution entry. Additionally, or alternatively, the resolution entry may comprise a new GUI in which acquisition is to be performed. Additionally, or alternatively, the resolution entry may comprise a candidate GUI element, such as the element that was actually acquired by the client device.

In some exemplary embodiments, the resolution entry may comprise a counter indicating a number of times the resolution entry was encountered by the system. In some exemplary embodiments, the counter may indicate a number of occurrences since a last resolution thereof, since a last time the entry was snoozed, or the like. Additionally, or alternatively the resolution entry may comprise a status indicator. In some exemplary embodiments, the status of the entry may be open, indicating that the entry is awaiting manual resolution. Additionally, or alternatively, the status of the entry may be snoozed, indicating that the entry is not to be processed, unless it is encountered again. Additionally, or alternatively, the status of the entry may be ignored, indicating that the entry is not to be processed, even if encountered again.

In some exemplary embodiments, the resolution entry itself may not comprise the candidate acquired element. Instead, a classifier, such as implemented using machine learning model, may automatically identify the best candidate and such candidate be utilized.

On Step 310, a single display may be used to display to a user, such as Administrator User 140 of FIG. 1, the two GUIs and elements therein for resolution. In some exemplary embodiments, display may show both GUIs in a manner allowing the user to compare between them. Each element may be visually indicated in the respective GUI. In some exemplary embodiments, the GUIs may be presented in a manner that is centered on the respective elements, so as avoiding the need of the user to modify the displayed portion of the GUI (e.g., using scrollbars) to locate the elements that are visually indicated. A non-limiting example of such a display is presented in FIGS. 6A-6B.

On Step 320, user input may be provided. The user may accept the suggested acquisition indicating it is correct. Additionally, or alternatively, the user may reject the suggested acquisition indicating it is incorrect. Additionally, or alternatively, the user may instruct the system to ignore the resolution entry and avoid having the same issue be raised again without resolving it. Additionally, or alternatively, the user may snooze the resolution entry, avoiding to resolve it, but allowing it to be reopened in the future.

In some exemplary embodiments, the user may skip the resolution entry, avoiding to resolve it at the present, but not snoozing it. The same resolution entry may be presented to the user (or another user) later on, even without the issue reoccurring. In some exemplary embodiments, the "skip" option may move the resolution entry to the end of the queue of resolutions to be processed.

In some exemplary embodiments, in response to the user accepting the suggested resolution, the resolution entry may be labeled as correct resolution (Step 330). In some exemplary embodiments, alternative resolution entries, comprising the same original GUI, element of interest, and new GUI but with a different candidate element in the new GUI, may be automatically retrieved and labeled as incorrect (Step 335).

In some exemplary embodiments, in response to the user rejecting the suggested resolution, the resolution entry may be labeled as incorrect (Step 350). In some exemplary embodiments, an alternative resolution entry for the same situation (e.g., same original GUI, same element of interest and same new GUI) having a different candidate element may be selected (355). The alternative resolution entry may be displayed and the user may respond to it (310-320). Additionally, or alternatively, the alternative resolution may be determined automatically, such as by employing the classifier to select another potential candidate, such as the second-best candidate if the top candidate was rejected, the third-best candidate if the second-based was also rejected, and so forth.

Additionally, or alternatively, the user may decide to "snooze" the resolution entry without resolving it (Step 340), or decide to ignore the resolution entry without resolving it (Step 360). In both cases, a next resolution may be selected and displayed. In some exemplary embodiments, if a resolution entry is ignored, alternative resolution entries for the same situation may be set as ignored as well. Additionally, or alternatively, if a resolution entry is snoozed, alternative resolution entries for the same situation may be snoozed. In some exemplary embodiments, the resolution entry may comprise the situation (e.g., original GUI, element of interest and new GUI) and a list of candidate element, thereby aggregating several potential resolutions for the same situation. In such a case, "snooze" and "ignore" may be set for the resolution entry as a whole, and not to a specific suggested candidate. "accept" or "reject", on the other hand, may be applied to each candidate separately.

Figure 3B:
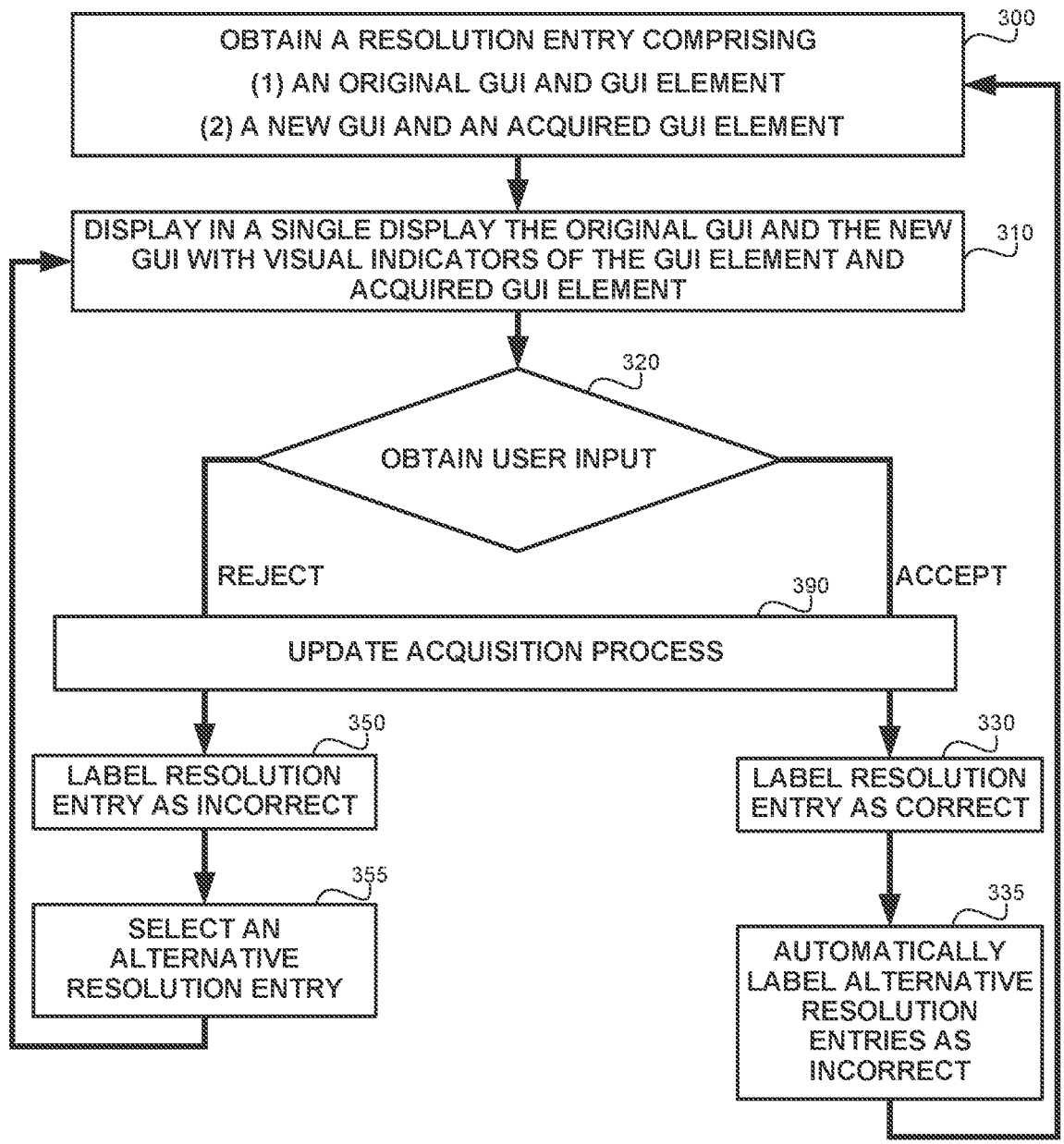

Referring now to FIG. 3B showing a flowchart diagram of a method, in accordance with some exemplary embodiments of the disclosed subject matter. FIG. 3B exemplifies that the user input may be used to update the acquisition process. For clarity, FIG. 3B is shown while addressing only the "accept" and "reject" inputs. However, the disclosed subject matter is not limited to only these inputs.

On Step 390, an acquisition process may be updated. The acquisition process may be updated by updating the representation set utilized thereby. For example, if the acquisition process utilizes a representation set to identify the element, the representation set may be updated. The representation set, which initially comprises a plurality of alternative representations, may be updated by excluding a subset of the plurality of alternative representations. The subset may be characterized by including alternative representations that do not conform with the user input. As an example, if the user input is "accept", indicating that the acquisition process was correct and the acquired GUI element is indeed the correct element, then the subset may comprise all alternative representations that, when applied on the new GUI, result with a different element (or no element at all). As a result, all alternative representations that do not conform with the input, e.g., do not result with the acquired GUI element, are removed and may not be used in further applications of the acquisition process. As another example, if the user input is "reject", indicating that the acquisition process was incorrect and the acquired GUI element is not the correct element, then the subset may comprise all alternative representations that, when applied on the new GUI, result with the same incorrect element. As a result, all alternative representations that do not conform with the input, e.g., result with the acquired GUI element, are removed and may not be used in further applications of the acquisition process.

Additionally or alternatively, the input may be used to update a detection model, a similarity model, a model generator, or the like. In some exemplary embodiments, the labeled information, such as labeled in Steps 330 and 350 may be gathered to update the relevant models. In some exemplary embodiments, the models may be trained and updated using the labeled information, so as to improve future applications of the models. As an example, a detection model may be updated directly. The updated detection model may be distributed and used. As another example, the model generator may be updated and in a next attempt to generate a detection model—for the same target element or for a different one—the generated model may be improved and become more robust. As yet another example, a similarity model may be updated and distributed to clients to be used for acquisition, for verification of acquisition, for determining confidence in acquisitions performed using the representation set, or the like.

Figure 4:
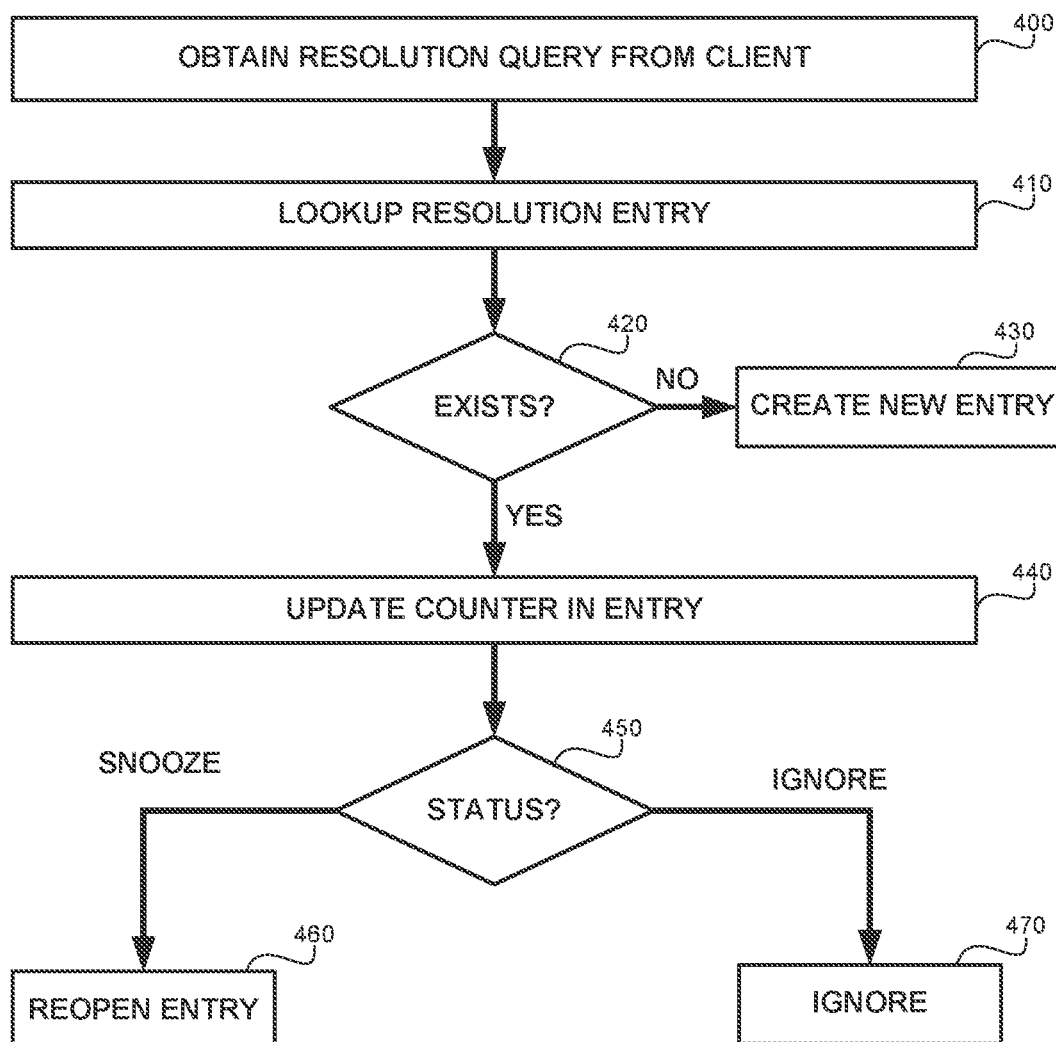

Referring now to FIG. 4 showing a flowchart diagram of a method, in accordance with some exemplary embodiments of the disclosed subject matter.

On Step 400, a resolution query may be obtained at a server. The resolution query may be obtained from a client device. The client device may issue the resolution query to indicate a situation comprising a current GUI, a reference GUI (e.g., original GUI) and an element of interest that is identified in the reference GUI. In some exemplary embodiments, the resolution query may further comprise a set of candidate elements that may correspond to element of interest. Additionally, or alternatively, each candidate may be provided with a confidence measurement or score indicating estimated confidence in the candidate being correct or incorrect. In some exemplary embodiments, the resolution query may be a report issued by client device, such as on Step 240 of FIG. 2.

On Step 410, resolution repository may be searched. The server may lookup a resolution entry matching the query. If such an entry does not exist (420), a new entry may be created and added to the repository (430). The new entry may be added to the end of a queue for processing. Additionally, or alternatively, if the entry does exist (420), it may be retrieved. On Step 440, a counter in the entry may be updated to indicate another occurrence of the same situation. In case the entry is an aggregated entry, candidates in the entry may be updated to include any candidate appearing in the query that was not previously included in the aggregated entry. In some exemplary embodiments, based on the updated counter, the location of the entry in the processing queue may be modified, such as to push a more frequent issue to be resolved before addressing rare issues.

On Step 450, the status of the entry may be checked. In case the entry was manually set to be ignored, the entry is still ignored (470). If the status of the entry is set to "snooze", the entry is reopened (460). In some exemplary embodiments, the reopened entry may be re-added to the processing queue. The reopened entry may be added to the end of the queue. Additionally, or alternatively, the reopened entry may be added to a different location based on the value of the occurrence counter of the entry. For example, the queue may be a priority-based queue that provides a First-In-First-Out (FIFO) ordering for entries of the same priority, but gives precedence to higher-priority entries.

Figure 5A:
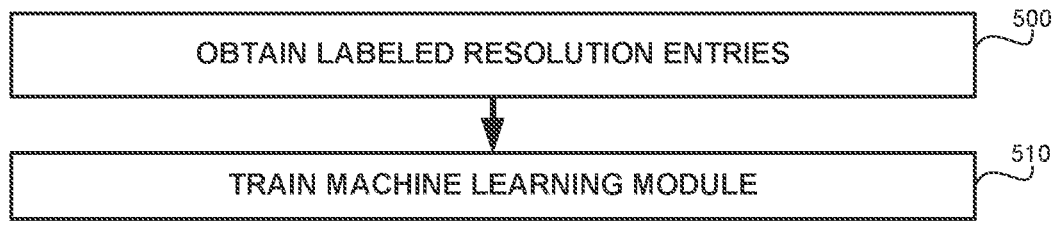

Referring now to FIG. 5A showing a flowchart diagram of a method, in accordance with some exemplary embodiments of the disclosed subject matter.

On Step 500, labeled resolution entries may be obtained. The labeled resolution entries may be retrieved from a database, data storage, repository, or the like. The labeled resolution entries may be resolution entries that were accepted or rejected, as illustrated in FIG. 3A. Additionally, or alternatively, the labeled resolution entry may comprise a situation (e.g., original GUI, element of interest and new GUI) a candidate element, and a label. The label may indicate whether the candidate element in the new GUI corresponds to the element of interest in the original GUI. Additionally, or alternatively, the label may indicate confidence measurement or score of the candidate element in the new GUI corresponding the element of interest in the original GUI. An "accepted" resolution may be set at 100%, and a "rejected" resolution may be set at "0%". In some exemplary embodiments, non-resolved resolution entries may comprise a confidence measurement or score that is derived from the acquisition process. As an example, in case a representation set is utilized, the confidence measurement may be based on the percentage of alternative representations that indicated the element as the identified element for acquisition. Hence, the confidence measurement may be external to any machine learning model and may provide an indication regarding the likelihood of the acquisition being correct, which may be utilized for training machine learning models.

On Step 510, a training dataset may be compiled based on the labeled resolution. Each labeled resolution may be represented by a valuation of a feature vector and a corresponding label. The labeled dataset may be used to train a machine learning model to provide predictions and labeling for other situations.

Figure 5B:
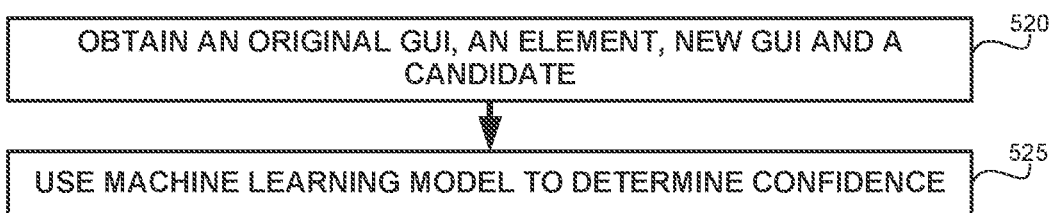

Referring now to FIG. 5B showing a flowchart diagram of a method, in accordance with some exemplary embodiments of the disclosed subject matter.

On Step 520, a situation and a candidate may be obtained. The situation may comprise an original GUI, an element of interest in the original GUI and a new GUI. The candidate may be a candidate element in the new GUI. It is noted that the GUIs may also be characterized by GUI context related information. In some exemplary embodiments, the situation and candidate may be obtained by an agent, such as 115 of FIG. 1, that applied a representation in order to resolve the situation. The representation may have yielded the candidate. Additionally or alternatively, the candidate may have been obtained using a detection model. In some exemplary embodiments, it may be desired to determine whether the acquisition is indeed correct.

On Step 525, the machine learning model may be used to determine a confidence measurement of the acquisition being correct. The information obtained on Step 520 may be transformed into a feature vector that is fed to the machine learning model. The machine learning model may provide the predicted confidence measurement.

In some exemplary embodiments, Step 525 may be performed at the client device itself. The machine learning model may be trained on a server and distributed to client devices. Additionally, or alternatively, the client device may send the information to the server and the server may apply the machine learning model on the server side. In some exemplary embodiments, the result may be reported to the client device.

In some exemplary embodiments, if the confidence measurement is below a threshold, such as 70%, 75%, 90%, or the like, the acquisition may be deemed as indefinite, and a resolution query to the server may be issued. In some exemplary embodiments, the resolution query may be issued in any case (e.g., the client device reports each acquisition), and only if the confidence measurement is below a threshold, do Steps 410 and onwards in FIG. 4 are performed. If the confidence measurement is above the threshold, the resolution query may be ignored and no resolution entry may be created. Additionally, or alternatively, the resolution query may be ignored only in case the resolution entry does not exist, thereby avoiding creating a new entry (430), but in case it exists, the resolution entry may still be processed (Steps 440-470).

Figure 5C:
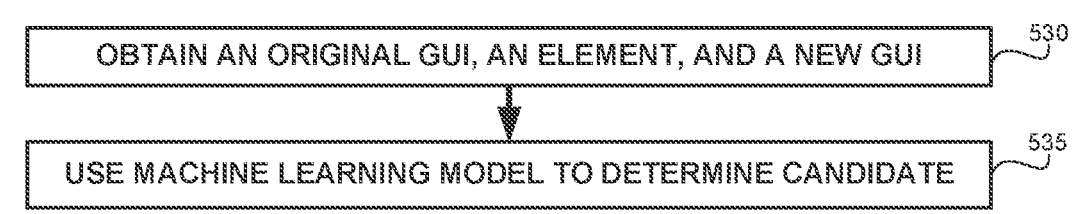

Referring now to FIG. 5C showing a flowchart diagram of a method, in accordance with some exemplary embodiments of the disclosed subject matter.

On Step 530, a situation may be obtained. The situation may comprise an original GUI, an element of interest in the original GUI and a new GUI. It is noted that the GUIs may also be characterized by GUI context related information. In some exemplary embodiments, the situation may be obtained by an agent, such as 115 of FIG. 1, that requires a to perform acquisition.

On Step 535, the machine learning model may be used to determine a candidate element in the new GUI. Additionally, or alternatively, confidence measurement of the candidate element may be determined. The information obtained on Step 530 may be transformed into a feature vector which is fed to the machine learning model. The machine learning model may provide the predicted candidate, confidence measurement thereof, or the like.

In some exemplary embodiments, Step 535 may be performed at the client device itself. The machine learning model may be trained on a server and distributed to client devices, so as to enable the client devices to perform acquisition locally. Additionally, or alternatively, the client device may send the information to the server and the server may apply the machine learning model on the server side and provide the outcome to the client device.

In some exemplary embodiments, if the confidence measurement is below a threshold, such as 70%, 75%, 90%, or the like, the automated acquisition may be deemed as indefinite, and a resolution query to the server may be issued. In some exemplary embodiments, the resolution query may be issued in any case (e.g., the client device reports each acquisition), and only if the confidence measurement is below a threshold, do Steps 410 and onwards in FIG. 4 are performed. If the confidence measurement is above the threshold, the resolution query may be ignored and no resolution entry may be created. Additionally, or alternatively, the resolution query may be ignored only in case the resolution entry does not exist, thereby avoiding creating a new entry (430), but in case it exists, the resolution entry may still be processed (Steps 440-470).

Figure 5D:
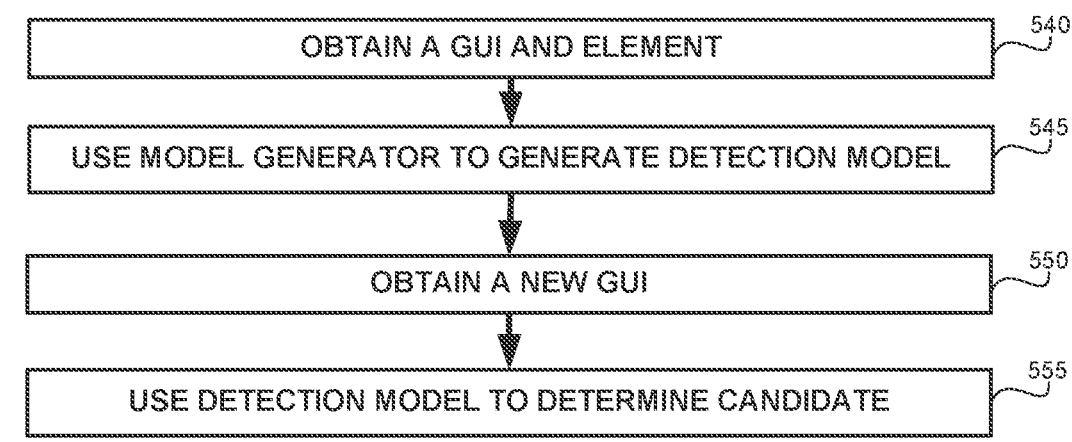

Referring now to FIG. 5D showing a flowchart diagram of a method, in accordance with some exemplary embodiments of the disclosed subject matter.

On Step 540, an original GUI and an element in the original GUI may be obtained.

On Step 545, a model generator may be utilized to generate a detection model for the element and the original GUI. The detection model may incorporate internally information relating to the original GUI and the element that may be utilized in the detection, such as the properties thereof, relationship between the element and other elements, or the like.

On Step 550, a new GUI may be obtained.

On Step 555, an acquisition process may be performed with respect to the new GUI. The acquisition process may be performed by applying the detection model generated on Step 540. The detection model may provide a candidate in the new GUI that is deemed by the model to be the element in the new GUI that corresponds to the element in the original GUI that was obtained on Step 540.

Figure 6A:
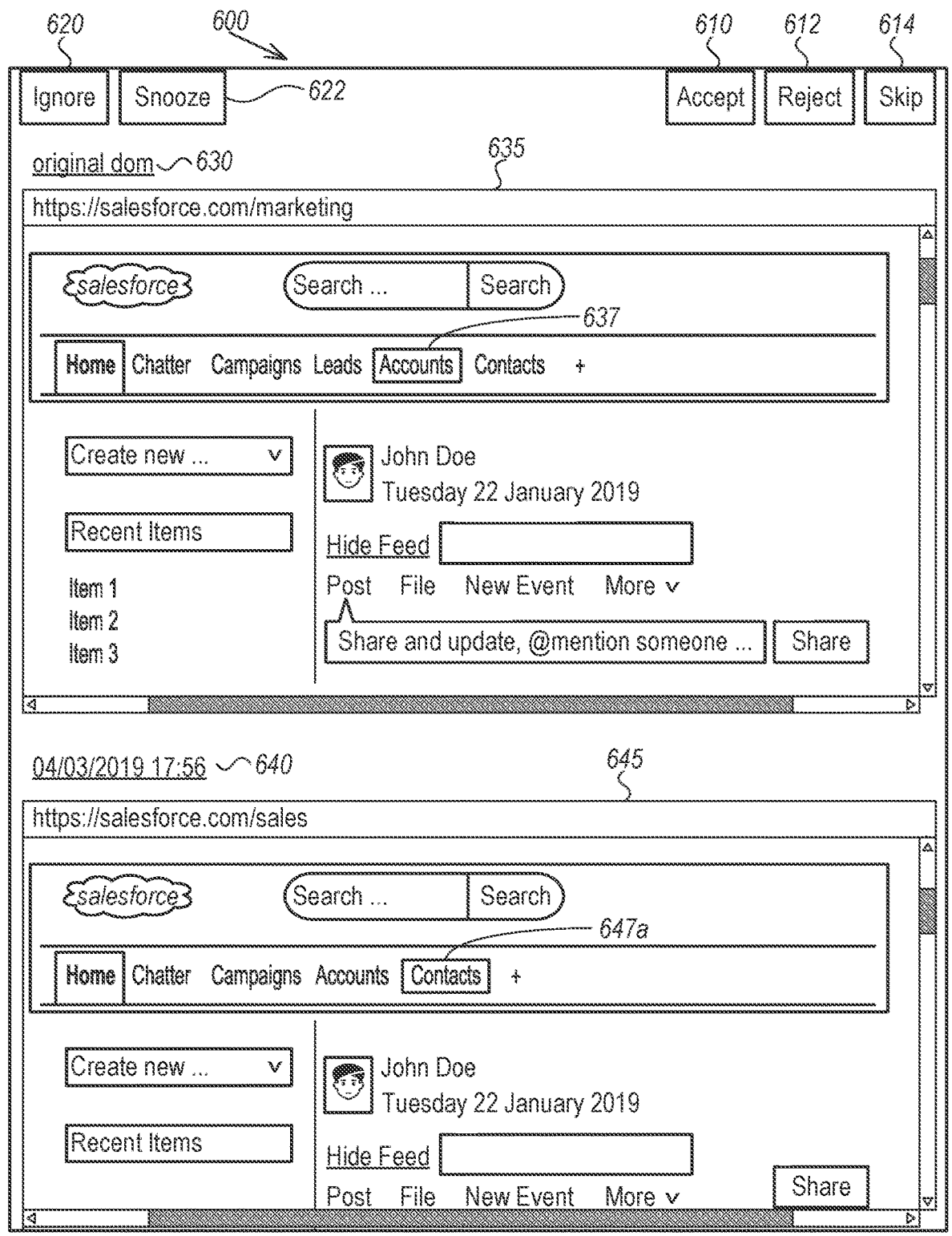
FIGS. 6A-6B show illustrations of displays, in accordance with some exemplary embodiments of the disclosed subject matter.

Referring now to FIG. 6A showing illustrations of displays, in accordance with some exemplary embodiments of the disclosed subject matter.

Screen 600 shows two GUIs in parallel: Original GUI 635 and Current GUI 645. Original GUI 635 serves as a reference for Current GUI 645. Original GUI 635 is a web page of a sales portal, and it is indicated as the original DOM (630). As can be seen in Original GUI 635, a user by the name of John Doe may be logged in. Original GUI 635 includes a menu of categories such as Home, Chatter, Leads, Accounts, Contacts, or the like. GUI 635 visually indicates that Home is selected. Element of Interest (EoI) 637 is visually indicated, such as using a highlighting, using a different color, or the like, in GUI 635 as shown in Screen 600. As is illustrated EoI 637 is the "Accounts" category. In some exemplary embodiments, information about EoI 637 may be presented such as externally to GUI 635 (not shown in the present illustration). The information may provide additional data about the captured element to a user. For example, if the element is part of a walkthrough process, the text of the step may be displayed. In some exemplary embodiments, this allows the user to understand the context of the element, making it easier for him to decide if to accept or reject the candidate suggestion displayed in Screen 600.

Screen 600 also shows the new GUI, Current GUI 645. Metadata Information (640) relating to Current GUI 645, such as timestamp in which Current GUI 645 was captured, URL, or the like, may be presented. Candidate Element 647a, the category "Contacts" is visually indicated in Screen 600.

It is also noted that both Original GUI 635 and Current GUI 645 are displayed in a pane showing only a portion thereof, due to limitation on the size of the display. Scrollbars may be utilized to select a portion for display, also referred to as visible portion. Screen 600 may be configured to center the visible portion of Original GUI 635 on EoI 637. In some exemplary embodiments, it is ensured that EoI 637 is visible and is shown in the visible portion of Original GUI 635. Similarly, Screen 600 may be configured to ensure Candidate Element 647a is shown in the visible portion of Current GUI 645.

In some exemplary embodiments, Screen 600 comprises button enabling a user, such as Administrator User 140 of FIG. 1, to review and provide input relating to the suggestion displayed by Screen. In some exemplary embodiments, an Accept Button 610 may be utilized to accept the candidate indicating the Candidate Element 647a corresponds to EoI 637. If, alternatively, the user decides that the two elements do not correspond, Reject Button 612 may be clicked. Additionally, or alternatively, the user may decide to skip the resolution without making any resolution at the moment using Skip Button 614. Additionally, or alternatively, the user may decide to ignore the acquisition scenario altogether. By clicking on Ignore Button 620, the resolution entry may be modified to an ignored status. Additionally, or alternatively, the user may opt to have the entry snoozed until it is re-encountered (or remained snoozed forever, if never encountered again) using Snooze Button 622.

Figure 6B:
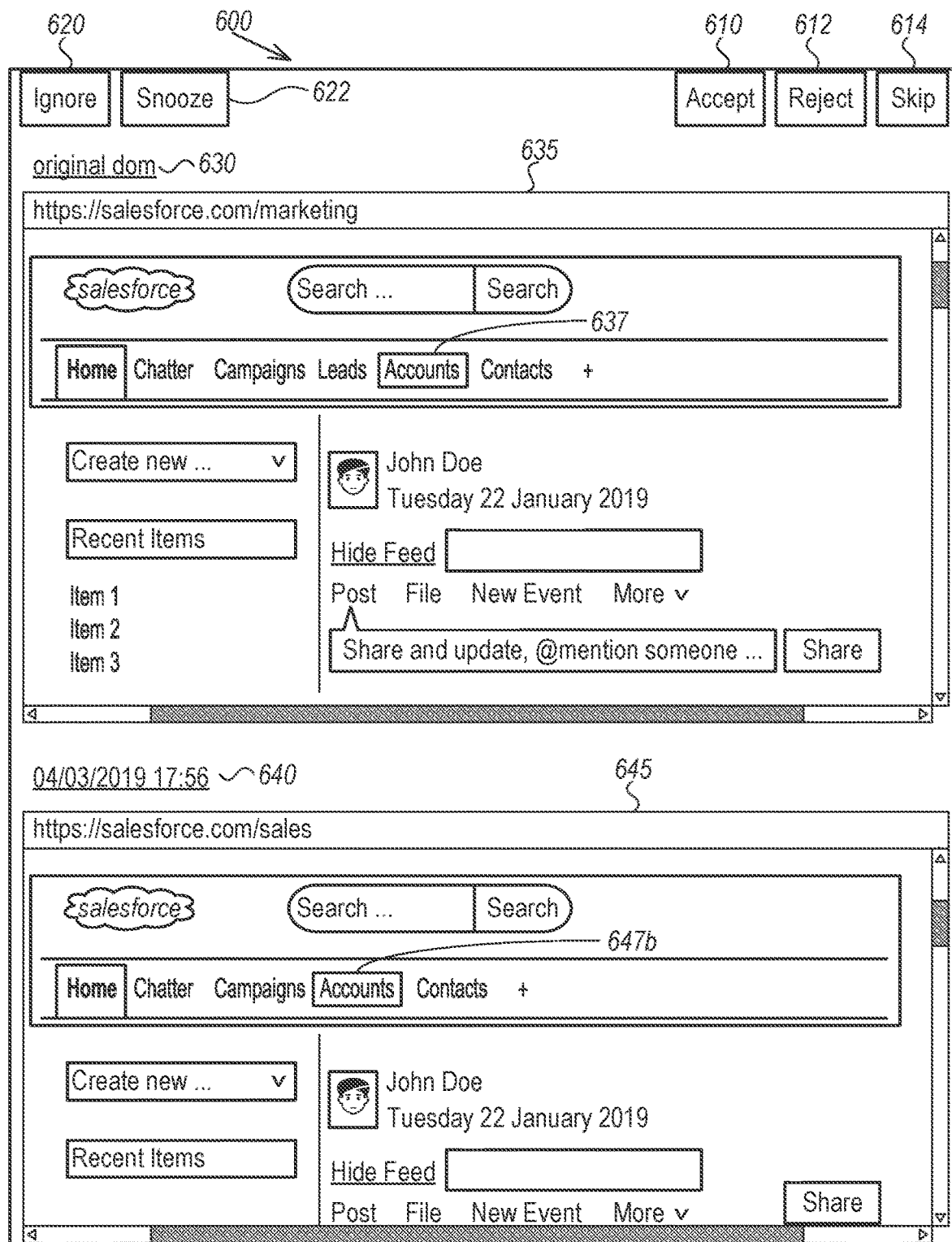

It is noted that after the user clicks any of Buttons 610, 612, 614, 720, 622, Screen 600 may be updated to display a different acquisition. In case the Reject Button 612 is pressed, Original GUI 635, EoI 637 and New GUI 645 may remain the same, and a different candidate may be shown, such as 647b, as is illustrated in FIG. 6B. In some cases, due to showing a different candidate in New GUI 645, a different portion of New GUI 645 may be visible, as the visible portion may be modified to include the different candidate in the visible portion. In some exemplary embodiments, New GUI 645 may be re-centered around or based on the different candidate.

In case the Accept Button 610 is pressed, the same situation (e.g., same Original GUI 635, EoI 637 and New GUI 645) may not be presented again, as the acquisition relating to such a situation was identified and confirmed.

In some exemplary embodiments, an ignored acquisition scenario may cause the same situation to not be repeated, similarly to the case where Accept Button 610 is clicked. In some exemplary embodiments, the same may be applicable to Snooze Button 622 and to Skip Button 614. In some cases, as the user does not wish to accept or reject the suggested acquisition, the user may also wish to avoid resolving a different suggested acquisition in the same situation. This is due to the fact that the same situation has a single resolution.

Additionally, or alternatively, Screen 600 may be configured to allow the user to manually select, such as by clicking using a pointing device, touch screen, or another input device, the element in New GUI 645 that corresponds to EoI 637. In some exemplary embodiments, the selection may be performed instead of rejecting a suggested resolution or thereafter.

In FIG. 6B, a different Candidate Element 647b is shown. Here, it appears the acquisition is correct, as Candidate Element 647b is the "Accounts" menu, and corresponds to EoI 637, "Accounts" menu of Original Screen 635.

Figure 7A:
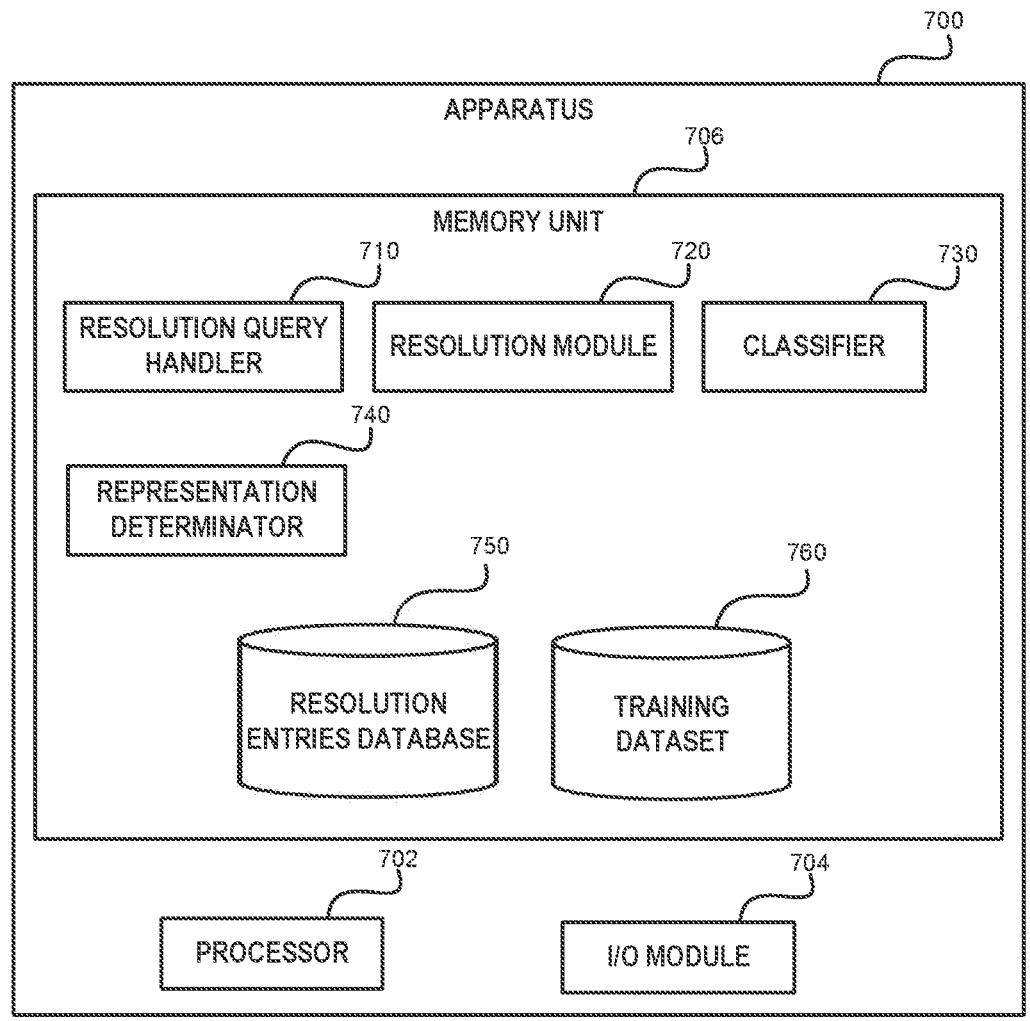
FIG. 7A shows a block diagram of an apparatus, in accordance with some exemplary embodiments of the disclosed subject matter.

Referring now to FIG. 7A, showing an apparatus in accordance with some exemplary embodiments of the disclosed subject matter.

In some exemplary embodiments, Apparatus 700 may be configured to provide backend services to client devices. Additionally or alternatively, Apparatus 700 may be configured to display potential acquisition candidates to human users for receiving manual feedback. Additionally or alternatively, Apparatus 700 may be configured to provide for an automated manner of performing acquisitions, of determining robust representations, validating acquisition candidates, or the like.

Additionally or alternatively, Apparatus 700 may be configured to determining representations of one or more GUI elements. Additionally or alternatively, Apparatus 700 may be able to transmit, broadcast, or the like a representation, machine learning model, or the like to a client device, to a plurality of client devices, or the like.

In some exemplary embodiments, Apparatus 700 may comprise one or more Processor(s) 702. Processor 702 may be a Central Processing Unit (CPU), a Graphical Processing Unit (GPU), a microprocessor, an electronic circuit, an Integrated Circuit (IC) or the like. Processor 702 may be utilized to perform computations required by Apparatus 700 or any of it subcomponents.

In some exemplary embodiments of the disclosed subject matter, Apparatus 700 may comprise an Input/Output (I/O) Module 704. I/O Module 704 may be utilized to provide an output to and receive input from a user, such as, for example obtaining selection of GUI elements, displaying acquisition candidates, obtaining user feedback regarding the acquisition candidates, or the like.

In some exemplary embodiments, Apparatus 700 may comprise Memory Unit 706. Memory Unit 706 may be a hard disk drive, a Flash disk, a Random Access Memory (RAM), a memory chip, or the like. In some exemplary embodiments, Memory Unit 706 may retain program code operative to cause Processor 702 to perform acts associated with any of the subcomponents of Apparatus 700. In some exemplary embodiments, Memory Unit 706 may retain GUIs, identification of elements of interest, resolution entries, or the like.

Memory Unit 706 may comprise one or more components as detailed below, implemented as executables, libraries, static libraries, functions, or any other executable components.

Memory Unit 706 may comprise a Resolution Query Handler 710. Resolution Query Handler 710 may be configured to handle resolution queries obtained from client devices. In some exemplary embodiments, a resolution query may comprise an original GUI and an element of interest therein, and a new GUI in which acquisition is desired. In some exemplary embodiments, the resolution query may comprise one or more potential candidate elements in the new GUI. Additionally or alternatively, each candidate may be assigned with a confidence measurement indicative of an estimated likelihood that the candidate corresponds to the element of interest.

In some exemplary embodiments, Resolution Query Handler 710 may be configured to lookup in Resolution Entries Database 750 a resolution entry that corresponds to the same situation. In some exemplary embodiments, if a resolution already exists, a counter may be updated, its status may or may not be updated, or the like. In some exemplary embodiments, if no such entry exists, anew entry may be created and added to Database 750.

In some exemplary embodiments, Memory Unit 706 may comprise a Resolution Module 720. Resolution Module 720 may be configured to retrieve a resolution entry from Database 750 and present the situation to an administrator user, such as 140 of FIG. 1. The user may provide her feedback, indicating whether the proposed acquisition displayed is correct or incorrect. Additionally or alternatively, ignore, skip, snooze or other similar operations may be performed. In some exemplary embodiments, Resolution Module 720 may be configured to select an entry from Database 750 in accordance with a queue, a priority queue, or the like. In some exemplary embodiments, the resolution entry may indicate a candidate element for acquisition, which may be visually indicated to the user for verification. Additionally or alternatively, the candidate may be determined automatically, such as by applying a representation of the element of interest on the current GUI. Additionally or alternatively, the candidate may be determined automatically using Classifier 730. In some exemplary embodiments, if the user rejects a proposed candidate, a next candidate may be obtained. The next candidate may be a next-best candidate, in accordance with a confidence measurement. In some exemplary embodiments, the first candidate may be obtained from the resolution entry itself, while the second candidate, presented after the first candidate is rejected, may be automatically obtained using Classifier 730, or vise versa. In some exemplary embodiments, the first candidate to be displayed may be selected based on the confidence measurement, so as to use to candidate proposed by Classifier 730 instead of the candidate indicated in the entry, in case the confidence measurement of the first is greater than of the later.

In some exemplary embodiments, Resolution Module 720 may label information based on the user input, and update Training Dataset 760 accordingly.

In some exemplary embodiments, Memory Unit 706 may comprise Classifier 730. Classifier 730 may be implemented using machine learning model. Classifier 730 may be configured to determine confidence measurement in a proposed candidate, determine a potential candidate, determine a potential candidate and its corresponding confidence measurement, or the like.

In some exemplary embodiments, Memory Unit 706 may comprise Representation Determinator 740 configured to determine a digital representation of an element in a GUI. The representation may be, for example, a representation set. In some exemplary embodiments, Representation Determinator 740 may be configured to generate a set of alternative representations of the GUI element to be used in a representation set. In some exemplary embodiments, Representation Determinator 740 may generate a set of alterative representations, a subset of which may be selected and used in the representation set. In some exemplary embodiments, Representation Determinator 740 may obtain screens from a historic screens database to apply the set of alternative representations thereon. Representation Determinator 740 may apply each of the alternative representations comprising the subset in order to build a representation set. By applying the alternative representations on different screens that were encountered in the past, it may be estimated which of the alternative representations is robust and would return the correct result over time. Using such information, the representation set may be built, by including alternative representations that have proved, using screens from historic screens database, to provide correct and definite results. In some exemplary embodiments, the Representation Determinator 740 may be configured to determine the representations to be obtained by client agents, enabling such agents to acquire the GUI elements. In some exemplary embodiments, Representation Determinator 740 may be configured to determine different representations for the same GUI element in different GUI contexts. The GUI context may be indicative for the platform from which the screen was obtained, indicative to characterizations of the user, or the like. As an example, a GUI context may comprise the language in which a web site is presented to the end user. There may be a button comprising a label "END" for the English version and a label "FIN" for the French version. Representation Determinator 740 may determine two different representations, one for each language. In some exemplary embodiments, all representations may be distributed to all agents to be selected thereby on-the-fly. Additionally or alternatively, each agent may provide a set of relevant GUI contexts thereto, and obtain the representation sets that match the relevant GUI contexts.

Figure 7B:
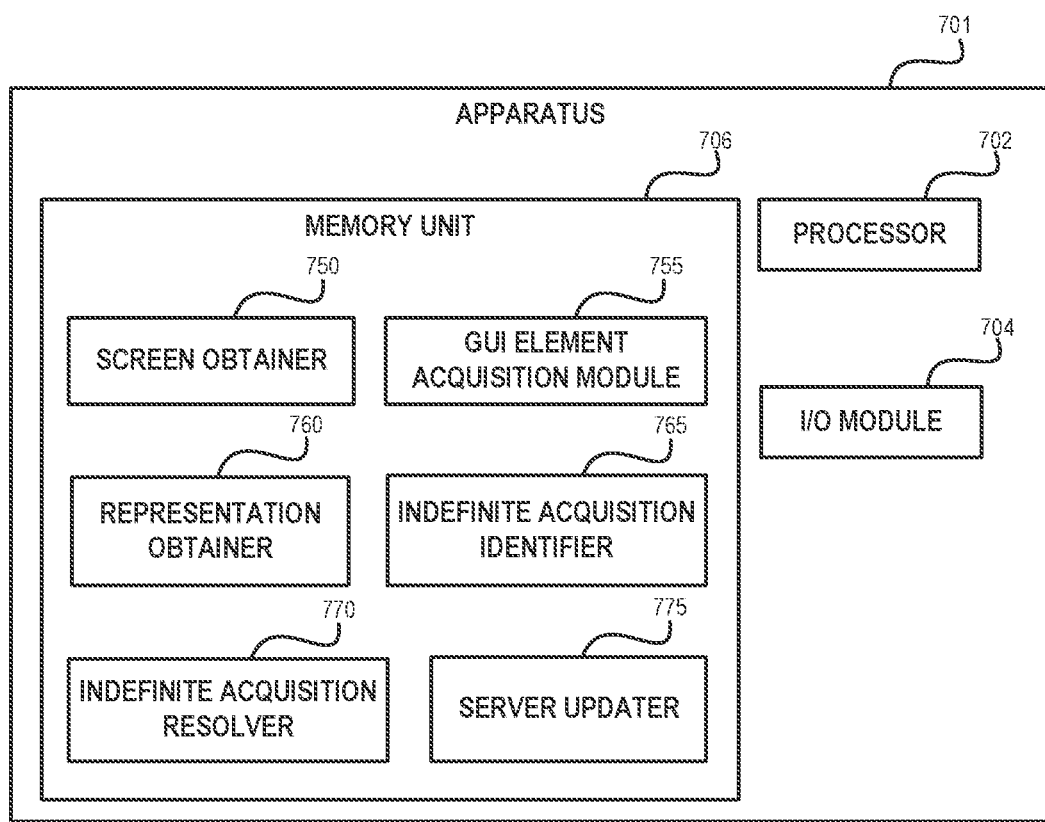
FIG. 7B shows a block diagram of an apparatus, in accordance with some exemplary embodiments of the disclosed subject matter.

Referring now to FIG. 7B, showing an apparatus in accordance with some exemplary embodiments of the disclosed subject matter. In some exemplary embodiments, Apparatus 701 may a client device, such as Client Device 110 of FIG. 1.

In some exemplary embodiments, Apparatus 701 may comprise one or more Processor(s) 702, an I/O Module 704, a Memory Unit 706, or the like.

In some exemplary embodiments, Processor 702 may be utilized to perform computations required by Apparatus 701 or any of it subcomponents.

I/O Module 704 may be utilized to communicate with other computerized devices, such as Server 120 of FIG. 1, Apparatus 700 of FIG. 7A, or the like, to receive a resolution query, a representation, to notify the server of an indefinite result and provide the relevant information thereto, to provide usage information and success rates of each representation set, or the like.

Memory Unit 706 may be utilized to retain representations to be used for acquisition of GUI elements.

Memory Unit 706 may comprise Screen Obtainer 750. Screen Obtainer 750 may be configured to obtain a GUI of a program. As an example, a user (not shown) may use Apparatus 701 for her needs, such as for utilizing a web-based application, a mobile application or the like. In order to provide services such as walkthroughs, usage analysis, functionality augmentation, or the like, Screen Obtainer 750 may obtain the current screen in which the user is using. The screen may be obtained by capturing a digital representation of the GUI, such as obtaining an XML file representing the screen, obtaining an HTML file representing the screen, obtaining a layout file representing the screen, obtaining a playground object representing the screen, obtaining a DOM file, such as in JavaScript™-based GUIs, obtaining a serialization of a DOM file, such as a JavaScript Object Notation (JSON) file, obtaining a screen-capture image of the screen, or the like.

In some exemplary embodiments, Screen Obtainer 750 may obtain a variation of the screen itself. In some cases, a digital representation of the screen, such as a DOM file, may comprise sensitive information that the owner of the GUI may not want to expose. In some exemplary embodiments, a blacklist of elements may be defined. Elements in the blacklist may be removed from the digital representation and not sent over the network. Additionally or alternatively, the blacklisted elements may be sent while modifying their properties, such as removing a text property, removing another attribute of the element, or the like. Additionally or alternatively, a whitelist may be defined to define which element may be included, and which properties thereof may be included. Additionally or alternatively, the digital representation may be hashed or otherwise manipulated such as to provide deterministic and consistent representation that cannot be decrypted. For example, text and other attributes of elements may be hashed completely or partially (e.g., first 3 letters may remain unhashed and the rest may be hashed). In some exemplary embodiments, elements and attributes to be modified may be determined based on a blacklist, based on a whitelist, or the like.

Memory Unit 706 may comprise GUI Element Acquisition Module 755. GUI Element Acquisition Module 755 may be configured to acquire a GUI element. A GUI element may be acquired automatically, based on an application of a representation on the GUI, obtained by Screen Obtainer 750. The acquired element may be reached, such as to allow access to properties thereof or modification of such properties, using a pointer, an identifier, a node in a DOM object, or the like. In some exemplary embodiments, GUI Element Acquisition Module 755 may trigger the execution of other components of Memory Unit 706 such as Representation Obtainer 760, Indefinite Acquisition Identifier 765, Indefinite Acquisition Resolver 770, or the like.

GUI Element Acquisition Module 755 may obtain a representation provided by Representation Obtainer 760. Additionally or alternatively, after applying a representation, GUI Element Acquisition Module 755 may be configured to invoke Indefinite Acquisition Identifier 765 in order to determine whether said applying the representation provided an indefinite result.

Memory Unit 706 may comprise Representation Obtainer 760. Representation Obtainer 760 may be configured to obtain GUI representations, such as from a server. In some exemplary embodiments, Representation Obtainer 760 may receive the representation based on a broadcast of the server, by sending a query to the server in a pull communication model, or the like. Representation Obtainer 760 may obtain the representation in advance and store the representation in Memory Unit 706. Additionally or alternatively, Representation Obtainer 760 may obtain the representation on demand, when a process that requires acquisition of a GUI element is made available. In some exemplary embodiments, Representation Obtainer 760 may obtain a plurality of representations, each of which useful for acquiring a different GUI element.

Memory Unit 706 may comprise Indefinite Acquisition Identifier 765. Indefinite Acquisition Identifier 765 may be configured to identify an indefinite result when attempting to acquire a GUI element. In some exemplary embodiments, in response to GUI Element Acquisition Module 755 applying the representation, Indefinite Acquisition Identifier 765 may determine whether the outcome is an indefinite result or a definite result.

Memory Unit 706 may comprise Indefinite Acquisition Resolver 770. Indefinite Acquisition Resolver 770 may be configured to resolve indefinite result of a GUI element for the purpose of acquiring an element albeit the indefinite result. In some exemplary embodiments, Indefinite Acquisition Resolver 770 may be configured to select a GUI element from a set of potential candidates that were identified by the application of the representation on the GUI. In some exemplary embodiments, a majority vote or other quorum decision may be made to select between the potential candidates. Additionally or alternatively, a score may be associated with each alternative representation in a representation set, allowing to use a weighted majority decision. In some exemplary embodiments, each candidate may comprise a score that is indicative of a confidence level in the candidate being a correct acquisition. In some exemplary embodiments, Indefinite Acquisition Resolver 770 may apply a machine learning model to select the correct candidate, such as from the obtained screen; between the potential candidates provided by the application of the representation, or the like. In some exemplary embodiments, the machine learning model may employ Classifier 730 of FIG. 7A. In some exemplary embodiments, the predictive model utilized by Classifier 730 may be provided to Apparatus 701 and applied so as to resolve indefinite results automatically.

Memory Unit 706 may comprise Server Updater 775. Server Updater 775 may be configured to send updates to a server such as Server 120 of FIG. 1, Apparatus 700 of FIG. 7A, or the like. In some exemplary embodiments, in response to an indefinite acquisition, Server Updater 775 may communicate the relevant information to the server, such as a resolution query. In some exemplary embodiments, resolution queries may be transmitted by Server Updater 775 for successful acquisitions, as well as unsuccessful acquisitions. Additionally or alternatively, acquisitions having confidence measurement below a threshold may be reported.

Additionally or alternatively, additional information may be transmitted by Server Updater 775 to the server. For example, usage statistics of application of representations may be transmitted. As another example, GUIs obtained by Screen Obtainer 750 may be transmitted to the server, and retained in a database.

Figure 8:
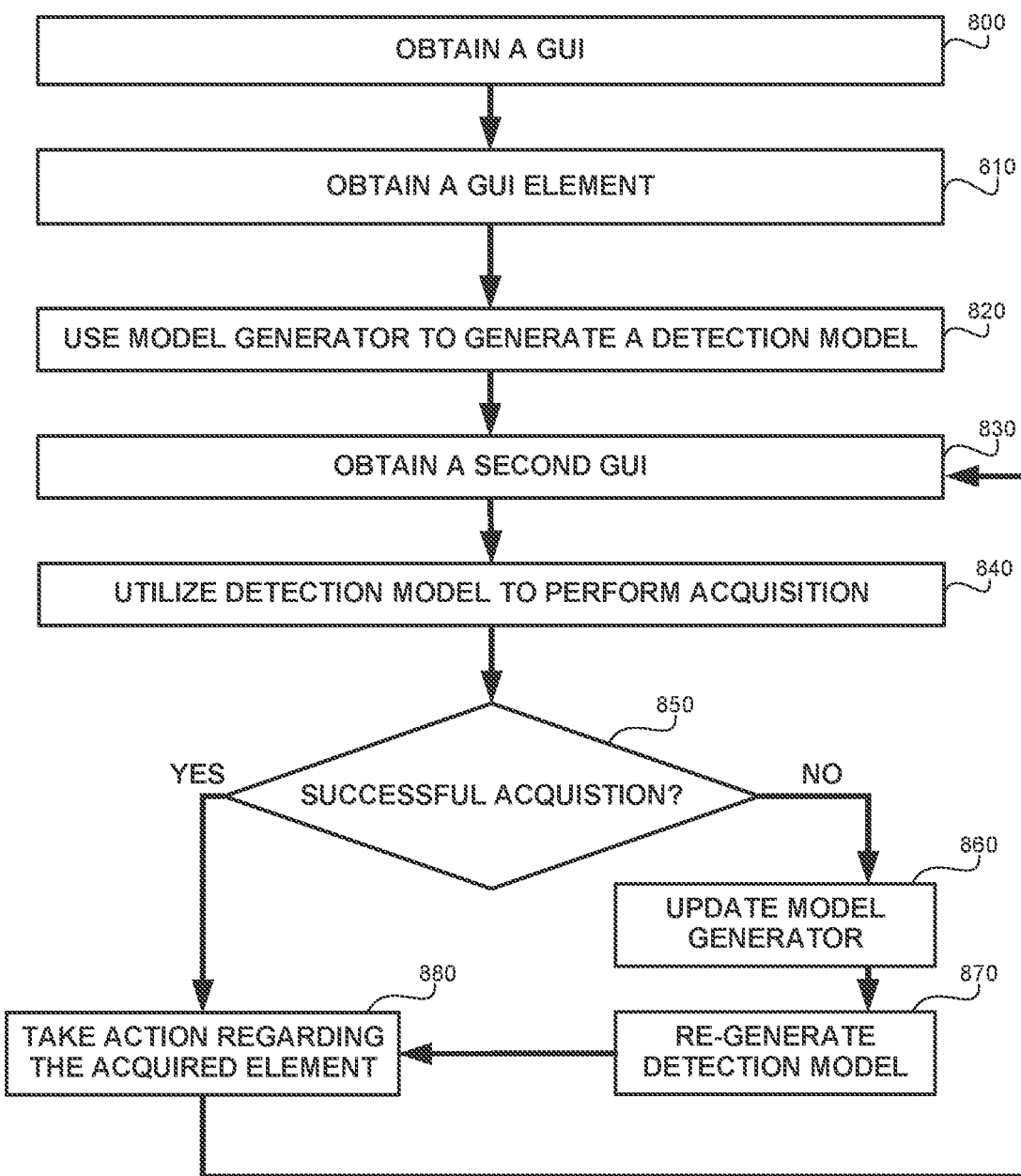
FIG. 8 shows a flowchart diagram of a method, in accordance with some exemplary embodiments of the disclosed subject matter.

Referring now to FIG. 8 showing a flowchart diagram of a method, in accordance with some exemplary embodiments of the disclosed subject matter.

In some exemplary embodiments, a GUI may be obtained (Step 800), a GUI element may be obtained (Step 810) and a model generator may be utilized to generate detection model for the element in other target GUIs (Step 820). On Step 830, a second GUI may be obtained upon which acquisition is performed. The detection model may be utilized for the acquisition process (Step 840). In some exemplary embodiments, in case the acquisition process was determined to be unsuccessful (Step 850), such as based on a confidence measurement of the detection model being below a threshold, or based on a user input rejecting the acquisition (provided in real-time or in retrospect), the model generator may be updated (Step 860). The updated model generator may be utilized to re-generate the detection model (Step 870) potentially providing a more robust detection model than the model provided at Step 820. In some exemplary embodiments, the updated model generator may be applied on other elements of the same GUI or of other GUIs, so as to provide different detection models. The detection models that are provided may be improved due to the additional information that was used to update the model generator in Step 860.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:

obtaining a digital representation of a first version of a Graphical User Interface (GUI), wherein the GUI comprises a GUI element;

obtaining a digital representation of a second version of the GUI;

obtaining an identified element, wherein the identified element is identified, using an acquisition process operated on the second version of the GUI, as being estimated to correspond to the GUI element in the first version of the GUI, wherein the acquisition process is configured to automatically acquire the GUI element over a plurality of GUIs, wherein the plurality of GUIs comprises the first and second versions of the GUI, wherein said automatically acquiring comprises identifying the GUI element within the plurality of GUIs and referring to the GUI element by automated means over the plurality of GUIs;

displaying, in parallel, the first version of the GUI and the second version of the GUI, wherein said displaying comprises:

presenting a visual indication of the GUI element in the first version of the GUI; and presenting a visual indication of the identified element in the second version of the GUI;

in response to said displaying, obtaining a user selection, wherein the user selection is indicative of whether or not the identified element corresponds to the GUI element; and updating the acquisition process based on the user selection.

2. The method of claim 1, wherein the acquisition process is operated on the second version of the GUI by applying a representation set representing the GUI element on the second version of the GUI, wherein the representation set comprises a plurality of alternative representations, each of which provides an independent manner of identifying the GUI element in GUIs, wherein said applying the representation set comprises applying, independently, each alternative representation in at least a subset of the plurality of alternative representations on the second version of the GUI, wherein said updating the acquisition process comprises updating the representation set.

3. The method of claim 1, wherein the digital representation of the first version is based on a first Document Object Model (DOM) object, wherein the digital representation of the second version is based on a second DOM object.

4. The method of claim 1, wherein the acquisition process utilizes a detection model configured to detect an element in a target GUI that corresponds to the GUI element in the first version of the GUI, wherein the detection model is configured to receive a feature vector, wherein the feature vector comprises properties of the target GUI, wherein said updating the acquisition process comprises updating the detection model based on the user selection.

5. The method of claim 1, wherein the acquisition process utilizes a similarity model, wherein the similarity model is configured to receive one or more properties of an original version of a GUI, one or more properties of a GUI element in the original version of the GUI, one or more properties of a new version of the GUI, and one or more properties of an element in the new version of the GUI, wherein the similarity model is configured to provide a similarity measurement regarding likelihood that the element in the new version of the GUI corresponds to the GUI element in the original version of the GUI, wherein said updating the acquisition process comprises updating the similarity model based on the user selection.

6. The method of claim 1, wherein the acquisition process is based on a detection model of the GUI element in the first version of the GUI, wherein the detection model is generated using a model generator, wherein the model generator is configured to be provided with at least one or more properties of the first version of the GUI and one or more properties of the GUI element, wherein the method further comprises updating the model generator using the user selection, the second version of the GUI and the identified element.

7. The method of claim 1 further comprises:
a client device obtaining the digital representation of the second version of the GUI;
the client device performing the acquisition process;
the client device reporting the digital representation of the second version of the GUI and the identified element to a server.

8. The method of claim 7, further comprises:
the client device determining a confidence measurement regarding accuracy of the acquisition process; and
wherein said reporting is contingent on the confidence measurement being below a threshold.

9. The method of claim 7, wherein the client device is configured to acquire the GUI element in versions of the GUI to provide at least one of:
monitor behavioral statistics of usage of the GUI element in the GUI, and
enhance user experience of the GUI using an augmentation of the GUI.

10. The method of claim 7, wherein said updating the acquisition process is performed by the server, wherein the acquisition process is based on a model that is trained based on confidence measurements derived, at least in part, based on the user selection.

11. The method of claim 1, wherein the user selection is one of:
confirming that the identified element corresponds to the GUI element; and
denying that the identified element corresponds to the GUI element.

12. The method of claim 1, wherein the user selection comprises a manual indication of a second element in the second version of the GUI that corresponds to the GUI element in the first version of the GUI.

13. The method of claim 12 further comprises obtaining a list of alternative estimated elements and corresponding confidence measurements, wherein the list comprises the identified element having a first confidence measurement and the alternative element having a second confidence measurement, wherein the first confidence measurement is greater than the second confidence measurement.

14. The method of claim 1, wherein in response to a user selection denying that the identified element corresponds to the GUI element, presenting a visual indication of an alternative element in the second version of the GUI that is estimated to correspond to the GUI element in the first version of the GUI.

15. The method of claim 1,
wherein the acquisition process is performed by identifying an element in the second version of the GUI using a representation of the GUI element;
wherein said updating the acquisition process based on the user selection comprises: updating the representation of the GUI element.

16. The method of claim 15, further comprises providing to a plurality of client devices the updated representation of the GUI element, whereby each of the plurality of client devices is enabled to acquire the GUI element in GUIs.

17. The method of claim 1, wherein the visual indication of the GUI element is an only visual indication that is not part of the first version of the GUI and that is displayed in the first version of the GUI, and the visual indication of the identified element is an only visual indication that is not part of the second version of the GUI and that is displayed in the second version of the GUI.

18. A system comprising:
a data repository retaining a plurality of versions of Graphical User Interfaces (GUIs) and corresponding GUI elements in the GUIs;
a plurality of client devices, wherein each client device is configured to:
obtain digital representations of versions of the GUIs; and
transmit the digital representations of the versions of the GUIs to said data repository; and
a server configured to:
obtain from said data repository, a first and second versions of a GUI from the plurality of versions of the GUIs;
obtain a GUI element that is comprised by the first version of the GUI;
obtain an identified element, wherein the identified element is identified, using an acquisition process operated on the second version of the GUI, as being estimated to correspond to the GUI element in the first version of the GUI, wherein the acquisition process is configured to automatically acquire the GUI element over the plurality of versions of the GUIs, wherein said automatically acquiring comprising identifying the GUI element within the plurality of versions of the GUIs and referring to the GUI element by automated means over the plurality of versions of the GUIs;

display, in parallel, the first version of the GUI and the second version of the GUI while presenting a visual indication of the GUI element in the first version of the GUI and presenting a visual indication of the identified element in the second version of the GUI;

in response to said display, obtain a user selection, wherein the user selection is indicative of whether or not the identified element corresponds to the GUI element; and updating the acquisition process based on the user selection.

19. A non-transitory computer readable medium retaining program instructions, which program instructions when read by a processor, cause the processor to perform a method comprising:

obtaining a digital representation of a first version of a Graphical User Interface (GUI), wherein the GUI comprises a GUI element;

obtaining a digital representation of a second version of the GUI;

obtaining an identified element, wherein the identified element is identified, using an acquisition process operated on the second version of the GUI, as being estimated to correspond to the GUI element in the first version of the GUI, wherein the acquisition process is configured to automatically acquire the GUI element over a plurality of GUIs, wherein the plurality of GUIs comprises the first and second versions of the GUI, wherein said automatically acquiring comprises identifying the GUI element within the plurality of GUIs and referring to the GUI element by automated means over the plurality of GUIs;

displaying, in parallel, the first version of the GUI and the second version of the GUI, wherein said displaying comprises:
  presenting a visual indication of the GUI element in the first version of the GUI; and
  presenting a visual indication of the identified element in the second version of the GUI;

in response to said displaying, obtaining a user selection, wherein the user selection is indicative of whether or not the identified element corresponds to the GUI element; and updating the acquisition process based on the user selection.

20. The computer program product of claim 19, wherein the acquisition process is operated on the second version of the GUI by applying a representation set representing the GUI element on the second version of the GUI, wherein the representation set comprises a plurality of alternative representations, each of which provides an independent manner of identifying the GUI element in GUIs, wherein said applying the representation set comprises applying, independently, each alternative representation in at least a subset of the plurality of alternative representations on the second version of the GUI, wherein said updating the acquisition process comprises updating the representation set.

21. The computer program product of claim 19, wherein the acquisition process utilizes a detection model configured to detect an element in a target GUI that corresponds to the GUI element in the first version of the GUI, wherein the detection model is configured to receive a feature vector, wherein the feature vector comprises properties of the target GUI, wherein said updating the acquisition process comprises updating the detection model based on the user selection.

22. The computer program product of claim 19, wherein the acquisition process utilizes a similarity model, wherein the similarity model is configured to receive one or more properties of an original version of a GUI, one or more properties of a GUI element in the original version of the GUI, one or more properties of a new version of the GUI, and one or more properties of an element in the new version of the GUI, wherein the similarity model is configured to provide a similarity measurement regarding likelihood that the element in the new version of the GUI corresponds to the GUI element in the original version of the GUI, wherein said updating the acquisition process comprises updating the similarity model based on the user selection.

23. The computer program product of claim 19, wherein the acquisition process is based on a detection model of the GUI element in the first version of the GUI, wherein the detection model is generated using a model generator, wherein the model generator is configured to be provided with at least one or more properties of the first version of the GUI and one or more properties of the GUI element, wherein the method further comprises updating the model generator using the user selection, the second version of the GUI and the identified element.

24. The computer program product of claim 19,
  wherein the acquisition process is performed by identifying an element in the second version of the GUI using a representation of the GUI element;
  wherein said updating the acquisition process based on the user selection comprises: updating the representation of the GUI element.

* * * * *